(12) United States Patent
Dvorak

(10) Patent No.: US 11,836,444 B2
(45) Date of Patent: Dec. 5, 2023

(54) METHODS AND SYSTEMS FOR CONSTRUCTING A COMPLEX FORMULA IN A SPREADSHEET CELL

(71) Applicant: Adaptam Inc., Palo Alto, CA (US)

(72) Inventor: Robert E. Dvorak, Portola Valley, CA (US)

(73) Assignee: Adaptam Inc., Palo Alto, CA (US)

( * ) Notice: Subject to any disclaimer, the term of this patent is extended or adjusted under 35 U.S.C. 154(b) by 0 days.

(21) Appl. No.: 17/359,430

(22) Filed: Jun. 25, 2021

(65) Prior Publication Data

US 2021/0406459 A1 Dec. 30, 2021

Related U.S. Application Data

(60) Provisional application No. 63/044,990, filed on Jun. 26, 2020, provisional application No. 63/044,989, filed on Jun. 26, 2020.

(51) Int. Cl.
| | |
|---|---|
| *G06F 40/18* | (2020.01) |
| *G06F 9/451* | (2018.01) |
| *G06F 3/0482* | (2013.01) |
| *G06F 3/0489* | (2022.01) |

(52) U.S. Cl.
CPC ............ *G06F 40/18* (2020.01); *G06F 3/0482* (2013.01); *G06F 3/0489* (2013.01); *G06F 9/451* (2018.02); *G06F 9/453* (2018.02)

(58) Field of Classification Search
CPC ...... G06F 3/0482; G06F 3/0489; G06F 9/451; G06F 9/453; G06F 40/18
See application file for complete search history.

(56) References Cited

U.S. PATENT DOCUMENTS

| | | | |
|---|---|---|---|
| 2004/0158557 A1 | 8/2004 | Welcker et al. | |
| 2013/0091419 A1 | 4/2013 | Caliman et al. | |
| 2015/0169532 A1* | 6/2015 | Otero | G06F 40/18 715/212 |
| 2017/0124054 A1* | 5/2017 | Campbell | G06F 3/04883 |
| 2017/0124142 A1 | 5/2017 | Becker et al. | |
| 2020/0034415 A1* | 1/2020 | Gordon | G06F 40/18 |
| 2020/0167321 A1 | 5/2020 | Sheehan et al. | |
| 2020/0184149 A1* | 6/2020 | Honsowetz | G06F 3/0482 |
| 2020/0257852 A1* | 8/2020 | Canton | G06F 40/151 |
| 2020/0285694 A1* | 9/2020 | Nield | G06F 9/45504 |
| 2020/0302013 A1* | 9/2020 | Stegmaier | G06F 40/205 |
| 2021/0209296 A1 | 7/2021 | Prakash et al. | |

* cited by examiner

*Primary Examiner* — Daniel W Parcher
(74) *Attorney, Agent, or Firm* — HAYNES BEFFEL & WOLFELD, LLP; Ernest J. Beffel, Jr.

(57) ABSTRACT

The technology disclosed includes a spreadsheet application with a formula building capability that allows users to construct a complex multi-component formula piece by piece, seeing the evaluated result of each component on the way to building the whole formula. It replaces users building complex formulas in a number of separate cells, troubleshooting each part and then having to either recombine the formula parts in one cell via a frequently error borne process or creating a master cell using a hidden set of all the piece parts making it harder to then see and understand what the formula is doing and apply copy paste.

42 Claims, 21 Drawing Sheets

(20 of 21 Drawing Sheet(s) Filed in Color)

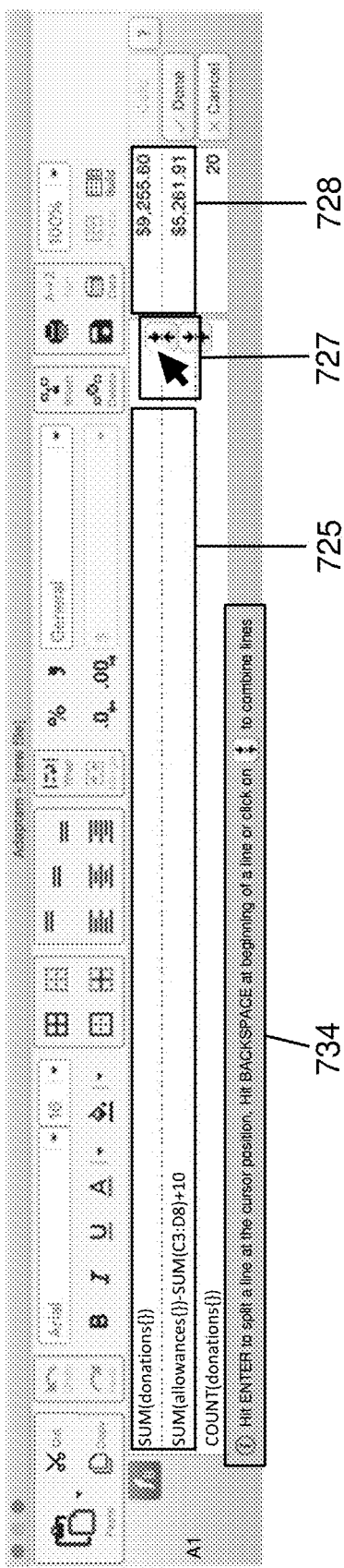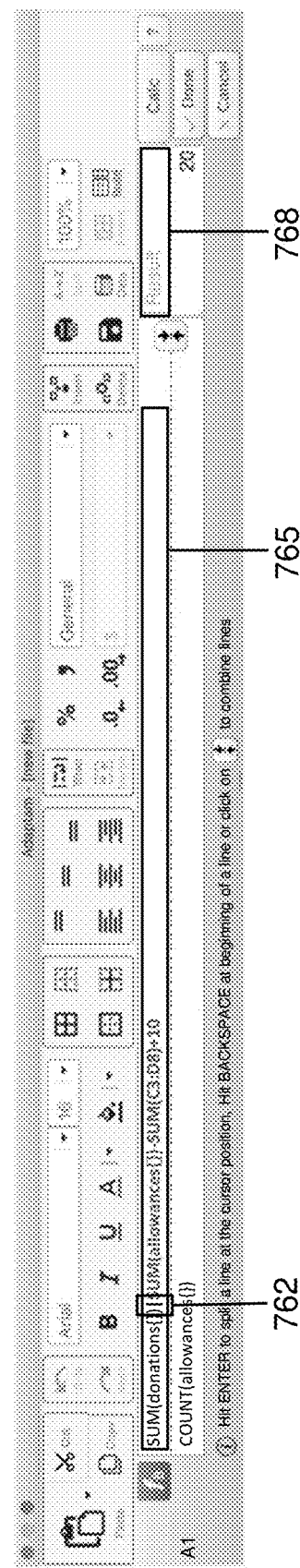
FIG. 7A
FIG. 7B

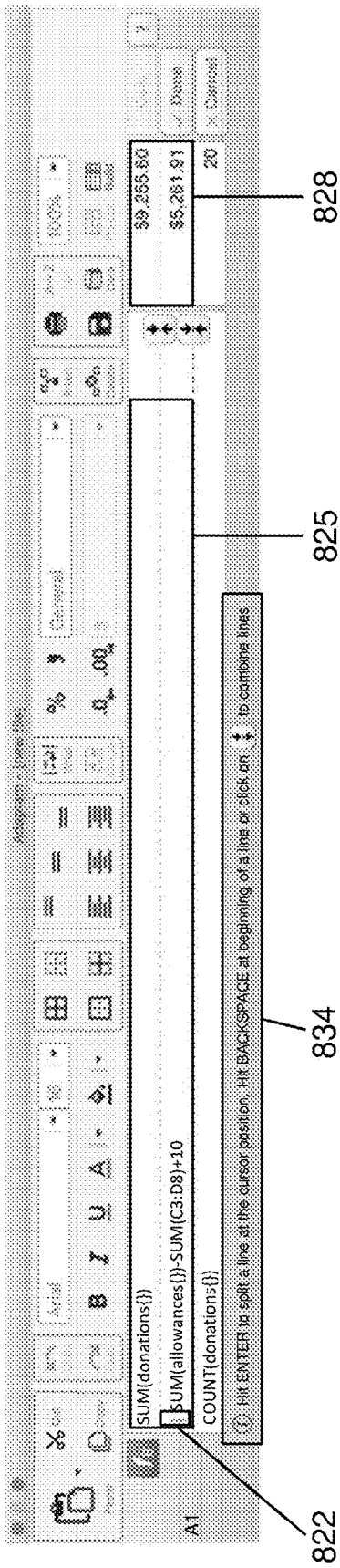
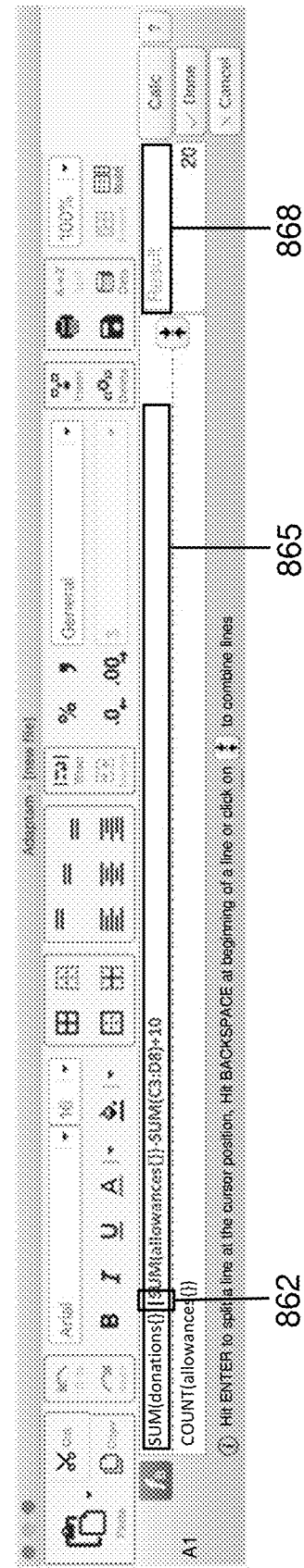
FIG. 8A
FIG. 8B

METHODS AND SYSTEMS FOR CONSTRUCTING A COMPLEX FORMULA IN A SPREADSHEET CELL

CROSS-REFERENCE

This application claims priority to and the benefit of U.S. Application 63/044,990, entitled "Methods And Systems for Constructing A Complex Formula in a Spreadsheet Cell", filed 26 Jun. 2020 and U.S. Application 63/044,989, entitled "Methods and Systems for Presenting Drop-Down, Pop-Up or Other Presentation of a Multi-Value Data Set in a Spreadsheet Cell", filed 26 Jun. 2020. The priority applications are incorporated by reference herein.

RELATED APPLICATIONS

This application is related to and incorporates by reference contemporaneously filed U.S. application Ser. No. 17/359,418, titled "Methods and Systems for Presenting Drop-Down, Pop-Up or Other Presentation of a Multi-Value Data Set in a Spreadsheet Cell", filed 25 Jun. 2021, which claims the benefit of U.S. Provisional Application No. 63/044,989, filed 26 Jun. 2020.

This application is also related to and incorporates by reference the following applications:

U.S. application Ser. No. 16/031,339, titled "Methods and Systems for Providing Selective Multi-Way Replication and Atomization of Cell Blocks and Other Elements in Spreadsheets and Presentations", filed 10 Jul. 2018, now U.S. Pat. No. 11,182,548, issued 23 Nov. 2021, which claims the benefit of U.S. Provisional Application No. 62/530,835, filed 10 Jul. 2017, U.S. application Ser. No. 16/031,379, titled "Methods and Systems for Connecting a Spreadsheet to External Data Sources with Formulaic Specification of Data Retrieval", filed 10 Jul. 2018, now U.S. Pat. No. 11,354,494, issued 7 Jun. 2022, which claims the benefit of U.S. Provisional Application No. 62/530,786, filed 10 Jul. 2017, U.S. application Ser. No. 16/031,759, titled "Methods and Systems for Connecting A Spreadsheet to External Data Sources with Temporal Replication of Cell Blocks", filed 10 Jul. 2018, now U.S. Pat. No. 11,017,165, issued 25 May 2021, which claims the benefit of U.S. Provisional Patent Application No. 62/530,794, filed on 10 Jul. 2017, and U.S. application Ser. No. 16/191,402, titled"Methods and Systems for Connecting A Spreadsheet to External Data Sources with Ordered Formulaic Specification of Data Retrieved" filed 14 Nov. 2018, now U.S. Pat. No. 11,036, 929, issued 15 Jun. 2021, which claims the benefit of US Provisional Patent Application No. 62/586,719," filed on 15 Nov. 2017.

BACKGROUND

As spreadsheet capabilities have grown, so has the complexity of spreadsheet formulas. Formulas now can include many different functions, algebraic operations, cell ranges and more complicated cell data operations (e.g., VLOOK-UPS). The single line nature of spreadsheet cell formulas does not give the user the ability to evaluate and debug the formula in the multiple parts as they write the overall formula. Instead, users are forced to divide the formula into multiple cells and then manually recombine the formulas from the multiple cells, risking errors and requiring a fair amount of work, or end up with a many formula built with cell references, requiring users to trace the calculation through many different cells, making copy paste of the formula much more complicated and error prone and sometimes causing users to hide these intermediate calculation cells making it more difficult for others to understand the formula and leading to more copy paste errors. This becomes even more complicated using our non-spreadsheet cell (NSC) formulaic data where the data is external to the spreadsheet cells or using our cell fed formulaic data where the data is not referenced by its cell references. Therein, lies an opportunity to simplify the creation and debugging of complex formulas.

Our technology makes it easy for users to construct a complex multi-component formula in multiple components, ensuring each component works and having the opportunity to reality check their calculated values. This is particularly helpful with formulas using large or complicated data sets and gives the user an easy way to probe any questionable results by further dividing the formula into components and seeing their values. All these components are then easily combined to create the final formula and the capability can be used to alter a complex formula a user wants to change.

SUMMARY

The technology disclosed includes a spreadsheet application with a formula building capability that allows users to construct a complex multi-component formula piece by piece, seeing the evaluated result of each component on the way to building the whole formula. It replaces users building complex formulas in a number of separate cells, troubleshooting each component and then having to either recombine the formula components in one cell via a frequently error borne process or create a master cell using a set of all the components making it harder to then see and understand what the formula is doing and harder to copy paste.

The disclosed technology allows users to divide the formulas into as many components as they would like and then easily combine those components into the whole formula. Each component has a pairing of a formula pair-part and an evaluation pair-part. The formula pair-part is the input area for a piece of the formula and the evaluation pair-part shows the resulting value for that formula component or in the event of a problem triggers an error message. These formulas can contain multiple spreadsheet functions and multiple algebraic operators using spreadsheet cell data and/or our Non-spreadsheet cell (NSC) data The capability can also be used to edit a formula within an existing cell by removing components of it, adding components to it, changing components or simply breaking it into components to see how the value was generated.

Particular aspects of the technology disclosed are described in the claims, specification and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 7A and FIG. 7B example a button-initiated method for combining pair-part lines in our technology.

FIG. 8A and FIG. 8B example a backspace-initiated method for combining pair-part lines.

FIG. 14A, FIG. 14B, FIG. 15A, FIG. 15B, FIG. 16A and FIG. 16B examples how our technology can be applied to existing formulas and how users can split lines (components) for further evaluation or changes.

FIG. 18A and FIG. 18B example how combining two lines (components) works in the embodiment in FIG. 17.

DETAILED DESCRIPTION

Figure 1:
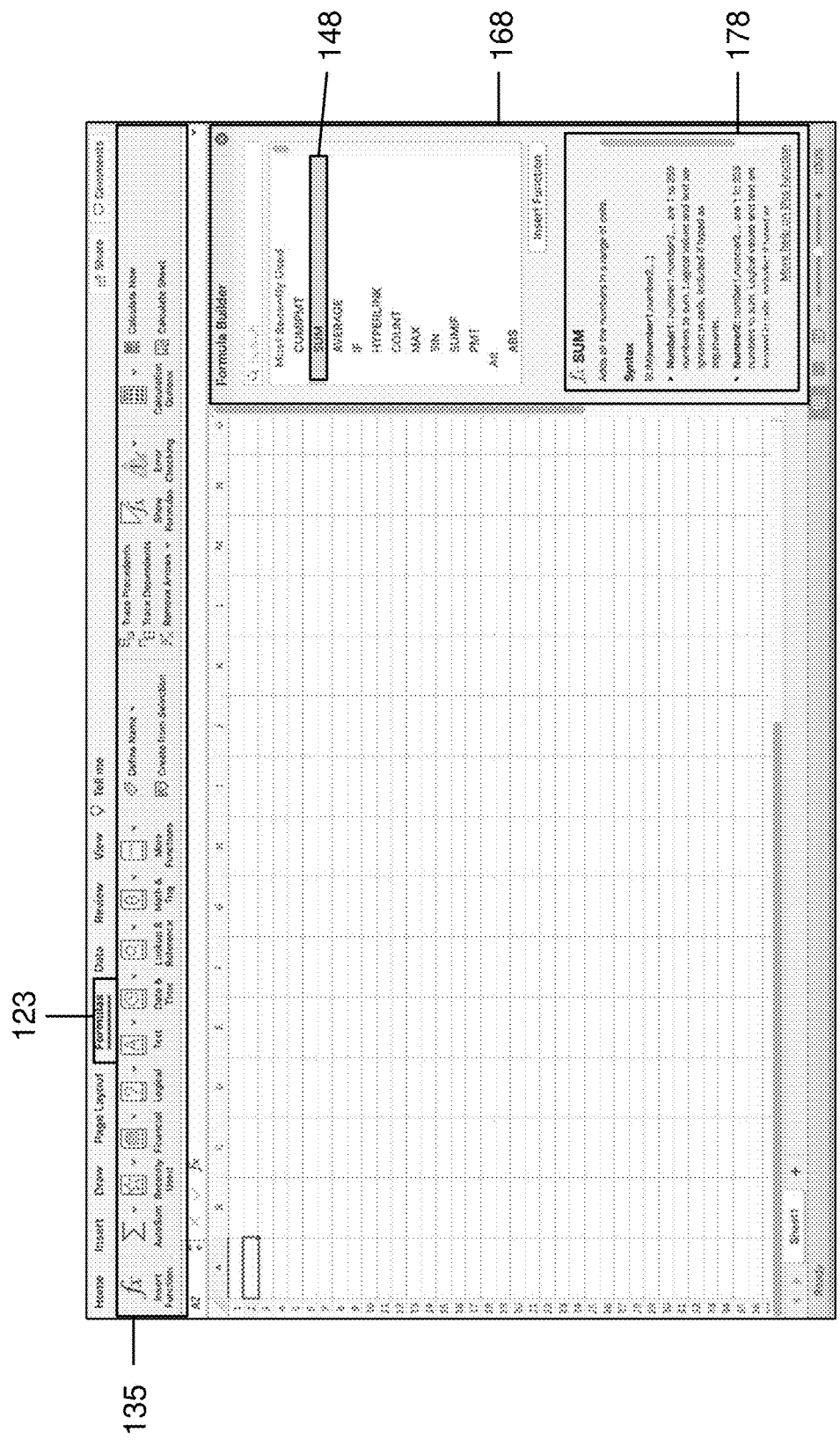
FIG. 1 shows the Microsoft Excel formulas ribbon and Formula Builder selection sidebar.

The following detailed description is made with reference to the figures. Example implementations are described to illustrate the technology disclosed, not to limit its scope, which is defined by the claims. Those of ordinary skill in the art will recognize a variety of equivalent variations on the description that follows.

When spreadsheet applications were first created, they electronically emulated tabular paper spreadsheets. More recently, Microsoft Excel, Google Sheets, Apple Numbers and others have dramatically increased the breadth of capabilities and usefulness of spreadsheets. Spreadsheet applications now access data across a wide variety of sources including relational, structured and semi-structured, open data protocol (OData), Web and Hadoop among others; and these applications manipulate data—such as in pivot tables and via Microsoft PowerPivot. Additionally, spreadsheets have extensive functionality for creating charts with SmartArt and for building forms, and they even have programming languages embedded within them, such as Visual Basic (VBA in Excel), Apps Script (in Google Sheets) and Apple Script (in Numbers). Spreadsheet providers like Microsoft Excel and Google Sheets cater to the specialized needs of users through many capabilities including vast numbers of spreadsheet functions (e.g., built in predefined formulas including SUM, COUNT and MIN). Microsoft Excel includes more than four hundred and fifty built-in functions and Google Sheets over four hundred. These built-in functions make operations desired by users dramatically simpler.

The formulaically defined non-spreadsheet cell (NSC) data variables and related technologies disclosed in "Methods and Systems for Connecting a Spreadsheet to External Data Sources with Formulaic Specification of Data Retrieval" filed previously, allow users to work with all types of numeric and text external data sets much larger and more complex than can currently fit in traditional spreadsheets. These larger less visible data sets however make it more important for users to have ways to understand the values created by their formulas and easily reality check that they have inputted the right data values by being able to look more piece by piece at the parts of the formulas generating those values.

The disclosed technology simplifies in spreadsheets the construction of a complex multi-part formula. It allows users to separately calculate the parts of the multi-part formula while easily combining those parts to create the overall formula. It allows users to see and test against their expectations, values calculated for parts of a formula and breakdown those parts as granularly as they would like. It identifies calculation errors at the formula part level, allows easy combinations to create the final formula and facilitates editing of that formula as desired.

Existing Spreadsheet Limitations

Microsoft Excel has created and patented some of the capabilities in their formula builder. However, they are actually spreadsheet function builders helping users fill in the syntax for the large number of functions supported. They are not capabilities to divide formulas, wherever the user would like, into components, where the components are composed of multiple functions and/or multiple algebraic operators. They do not all the user to see the calculated intermediate values for user devised formula components, as they build the overall formula. And they certainly do not, as our technology does for components, include formulaic data and they do not allow the user to combine components or split the components for more detailed intermediate component evaluation.

Microsoft Excel has by far the most elaborate support of what it calls formulas with a spreadsheet ribbon tab dedicated to it. FIG. 1 shows that ribbon tab 'Formulas' 123 and the ribbon 135 with what they call the 'Formula Builder' sidebar 168. The ribbon mostly has buttons for groups of different Functions such as 'Financial', 'Logical', 'Text' and other capabilities like 'Calculation options' that determine the frequency of recalculation. FIG. 1 shows the sidebar 168 in the function selector mode with a recently used function 'SUM' highlighted 148 and its helpful syntax description shown below 178.

Figure 2:
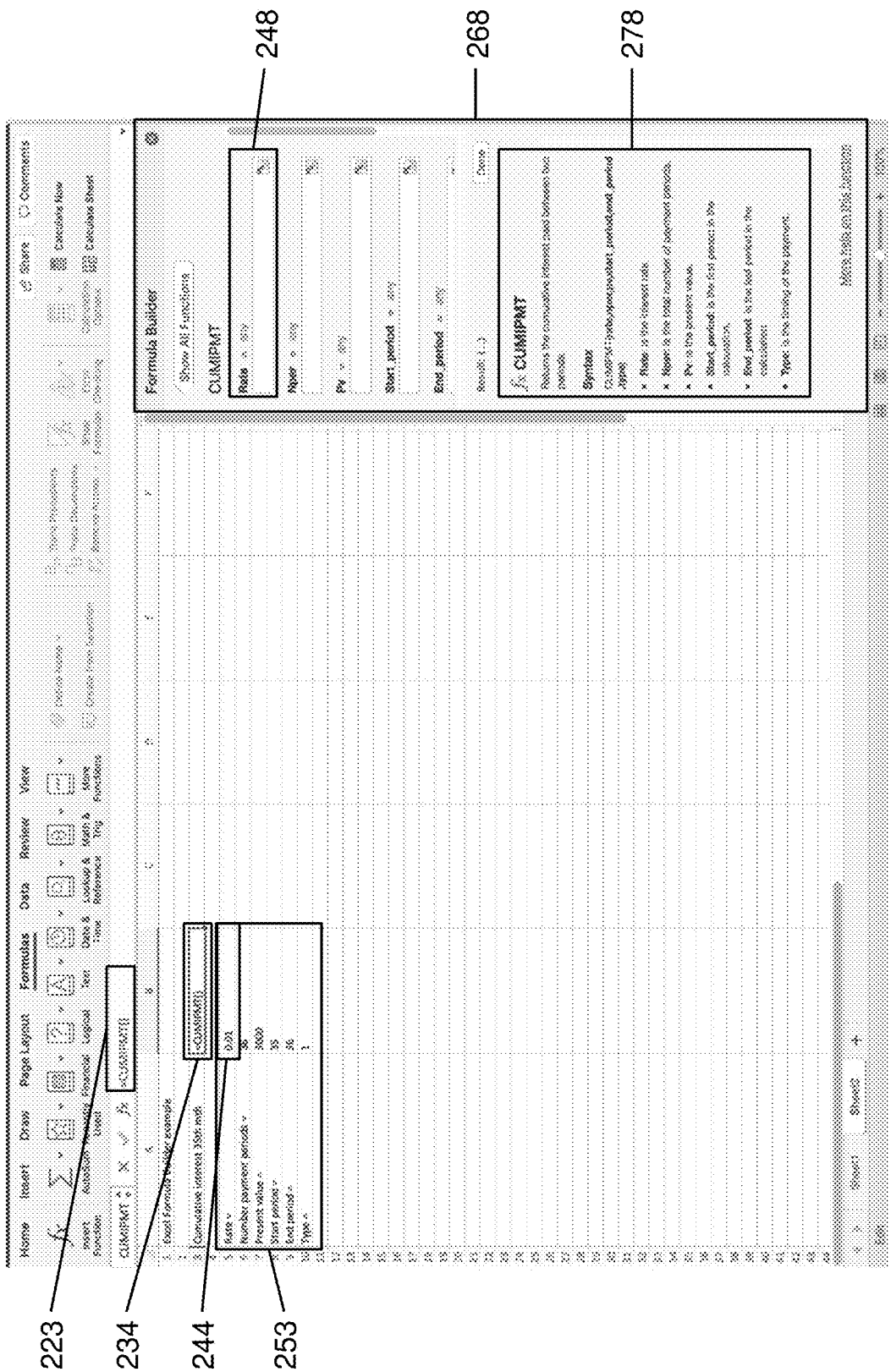
FIG. 2 shows the Microsoft Excel Formula Builder sidebar for the function CUMIPMT.

FIG. 2 shows how the Microsoft Formula Builder helps a user by giving them syntax information and input boxes for each of the formula argument inputs. The user is doing a more complicated function 'CUMIPMT' 223 and has already setup the input values in their spreadsheet 253. With the selection the function the top area of the formula builder sidebar 268 now houses input bars for each of the argument inputs. Its helpful argument description is shown below 278. This facilitates the user putting the right cell or manual input into the right part (argument) of the function input; as exampled, the user should input into the top input bar 248 the Rate value in cell 'B' 244. This clearly helps user correctly fill in function formulas but is not something that helps users constructing complicated formulas and seeing the calculated values of parts of those formulas where there are multiple functions and algebraic terms which the user wants to divide as they would like. It also only works for functions, not working for other parts of a formula. And it does not persist, so the user can look at its value or values and while looking at the value of other parts of the formula. Instead, it shows its values until you are done with that function and move to another part of the formula at which point it is no longer visible. Its values are therefore not groupable with other values for looking at part of a formula.

Our Formula Builder

The disclosed formula building technology is not to help you understand spreadsheet function input syntax and correctly supply the desired inputs. Instead, our disclosed technology is for building multi-function and/or multi-algebraic formulas piece by piece, in whatever combinations desired by the user, seeing that each part calculates correctly and seeing what value it generates.

Figure 3:
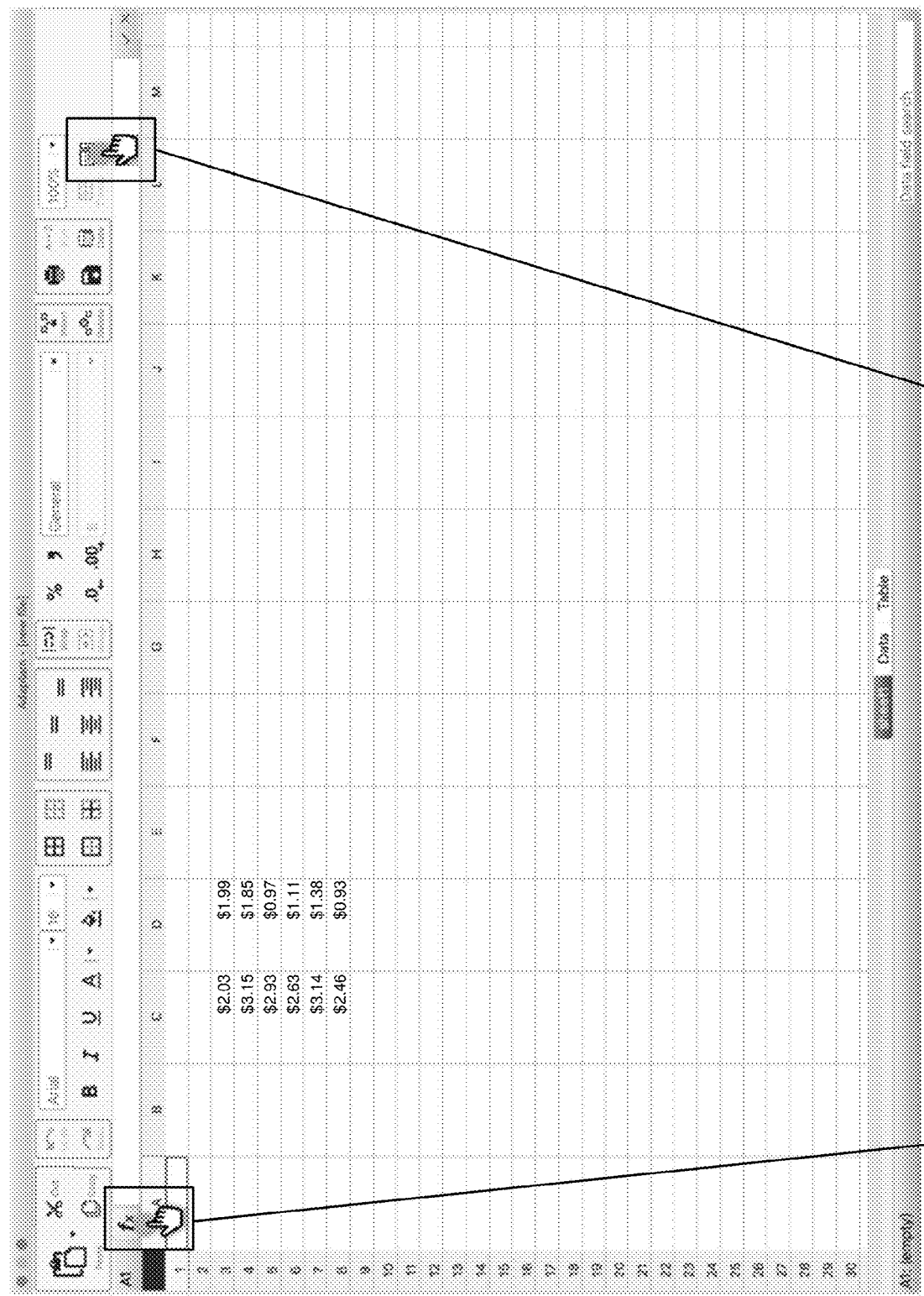
FIG. 3 examples two different ways of triggering our Build capability.

FIG. 3 examples two different ways of triggering the Build capability. One is clicking a button on the ribbon 328 and could have been by making a selection on a menu dropdown. The second is clicking on the formula bar indicator 'f$_x$' 321 and either selecting Build from the dropdown or clicking it until you get in this embodiment the blue 'f$_B$' build bar shown in FIG. 4 421. In this embodiment we have called our formula builder 'Build' and used the blue 'f$_B$' indicator—however clearly it could be named and colored otherwise.

Figure 4:
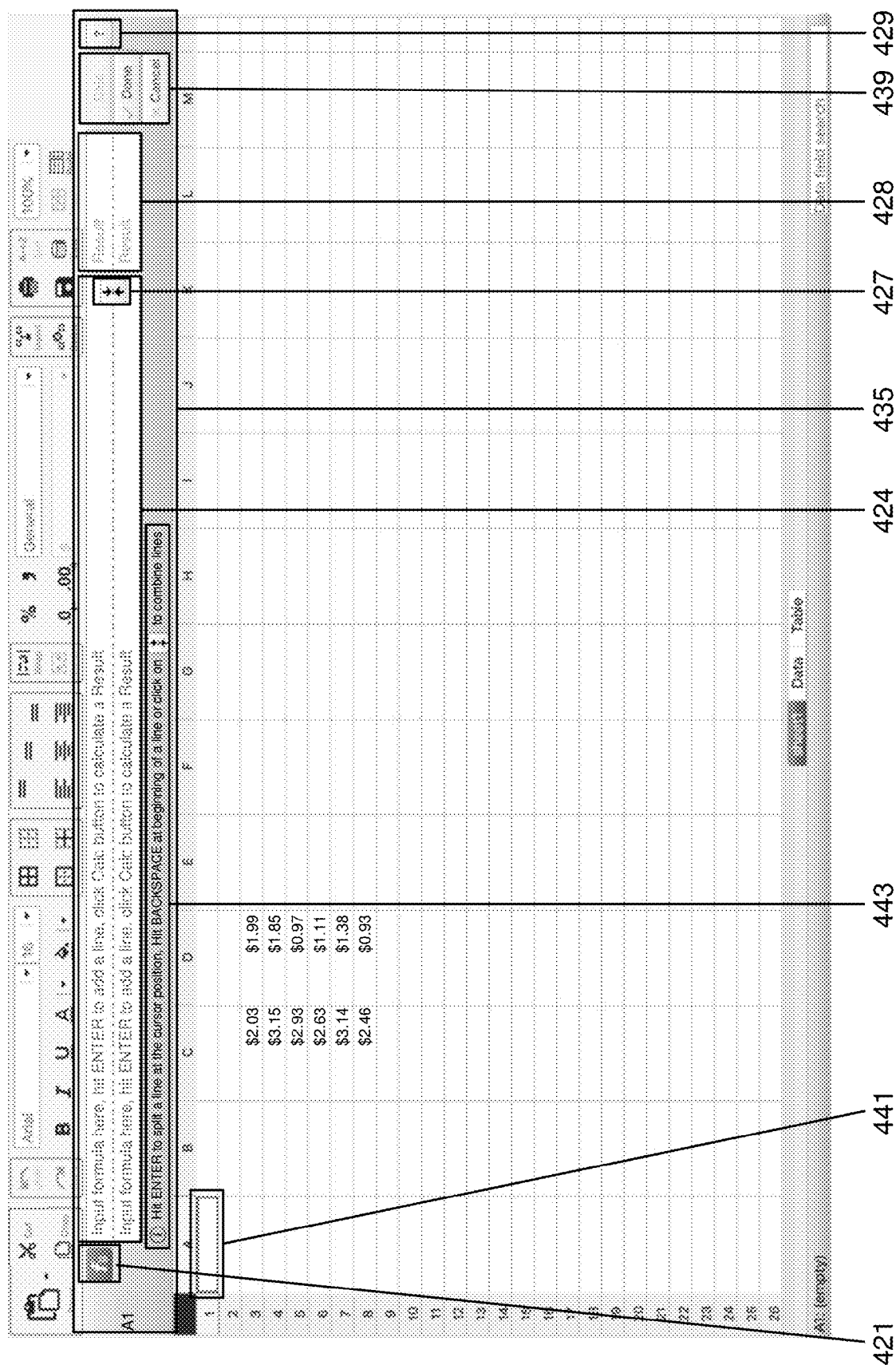
FIG. 4 examples an embodiment of our starting Build bar UI.

FIG. 4 examples for this embodiment of our technology the starting build UI, which is a Build bar 435. In this embodiment, for convenience, it opens with two lines, each having two parts. One part for the formula 424 and one part for evaluation of the formula 428. In this embodiment, the formula pair-part 424 is to the left and has instructions to the user 'Input formula here, hit ENTER (PC version, RETURN in the Mac version) to add a line, click Calc button to calculate a Result' The evaluation pair-part 428 is to the right and says Result until replaced with a calculated value. Although that order could be reversed, and the Build UI could open with one part-pair or with more than two. In this embodiment the Build UI also opens with a short set of instructions 443, a combine button 427, a help button 429 and three buttons 439 that we will explain as they are used. A formula that is built appears in a cell that is selected 441.

Figure 5A:
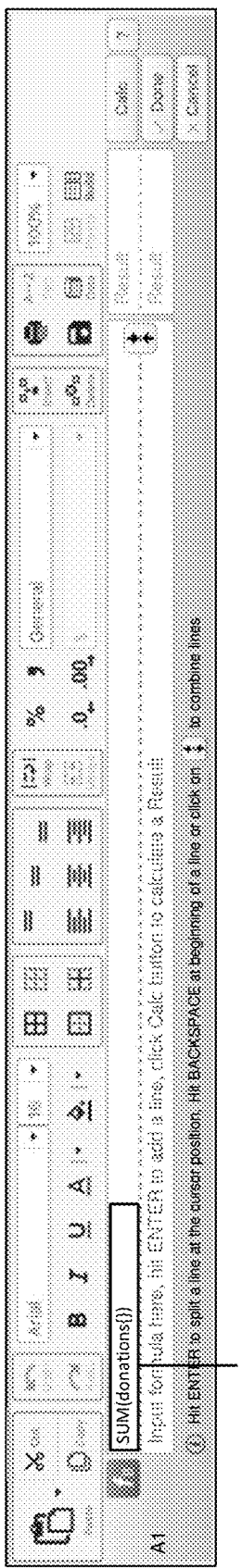
FIG. 5A, FIG. 5B and FIG. 5C example the creation of a formula component pair-part and a Calc button-initiated way of triggering its pair-part evaluation.
Figure 5B:
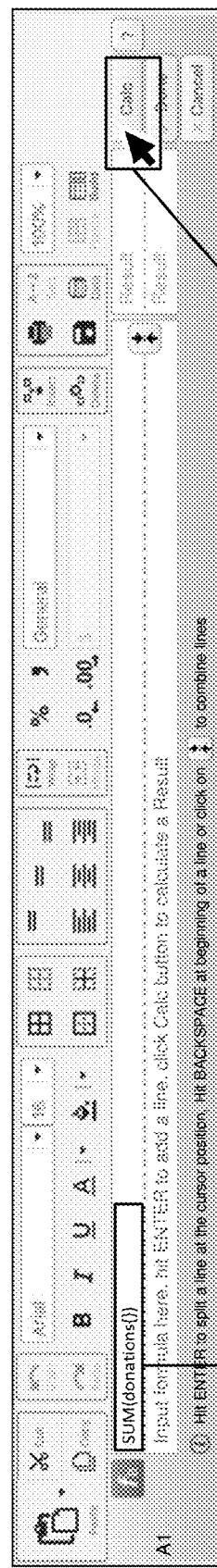
Figure 5C:
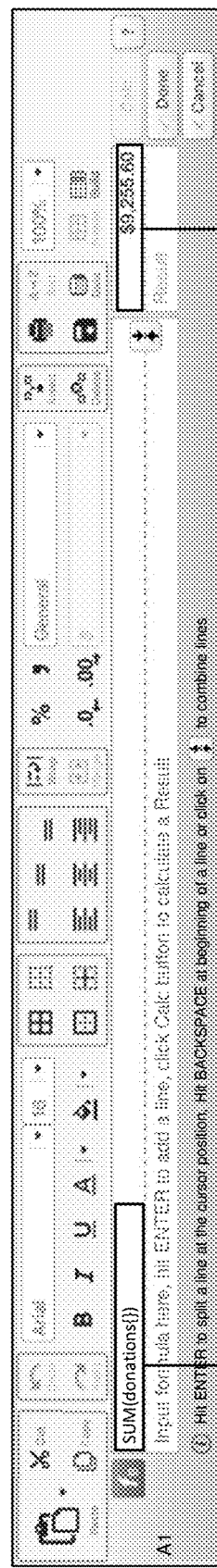

FIG. 5A through FIG. 5C example the creation of a formula component pair-part and one way of triggering its evaluation in an embodiment of our technology. FIG. 5A examples the user typing a formula component of 'SUM (donations{ })' Or 522 in the formula pair-part. In FIG. 5B the user then triggers the evaluation of the formula component 552 by clicking the Calc button 559. The result of that action is then shown in FIG. 5C where the result of the evaluation '$9,255.60' appears in the evaluation pair-part 588. Thus, allowing the user to see the calculation of formula SUM(donations Or 582. In this example evaluating a formula using our Non-Spreadsheet Cell (NSC) formulaic data, described in our previously cited patent filings, however as we will example later that formula could just have easily used cell data or values inputted into the formula. Other methods for triggering the evaluation of the formula could be employed.

Figure 6A:
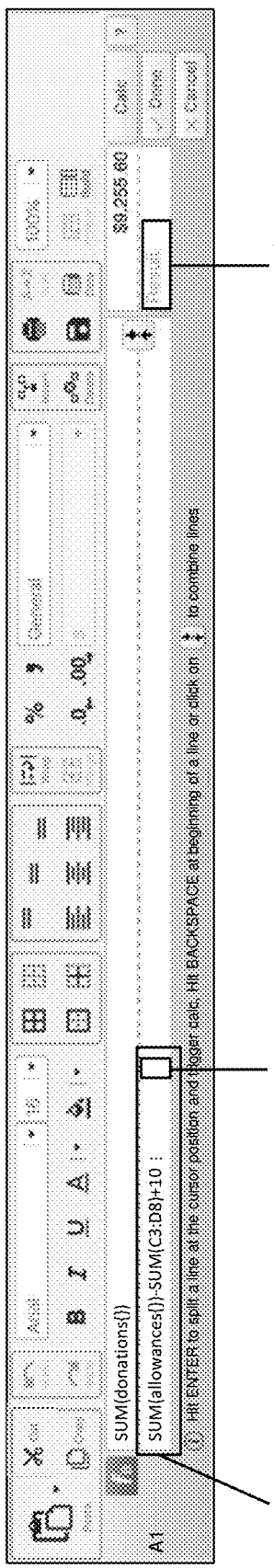
FIG. 6A and FIG. 6B examples another method of triggering a formula component pair-part evaluation.
Figure 6B:
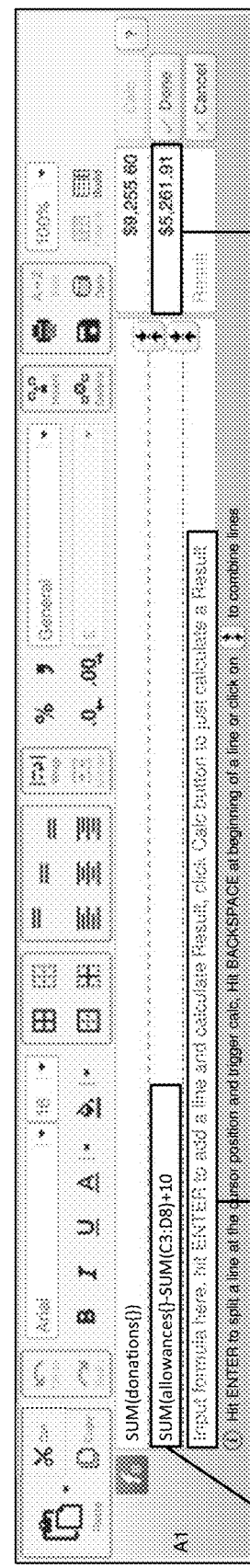

FIG. 6A and FIG. 6B example another embodiment having an additional method of triggering a formula component pair-part evaluation. The user types a formula component 'SUM(allowances{ })-SUM(C3:D8)+10' into the second line 633 and when they have completed that formula with the cursor 634 at the end of the formula they hit ENTER (PC) or RETURN (Mac). The outcome of that is shown in FIG. 6B where the Result for the second line '$5,261.91' 668 has been automatically evaluated for the formula pair-part 663 and an additional line 674 has been added with the cursor at the beginning of it—ready for typing in that line. The additional capability for triggering the formula part evaluation is reflected in the Input instructions in that third line 674 that states 'Input formula here, hit ENTER (PC version, RETURN in the Mac version) to add a line and calculate Result, click Calc button to just calculate a Result'. This instruction is different than the one in 424 in FIG. 4 in the underlined content that informs the user of the additional capability of calculating the Result when you hit ENTER (or in the Mac version RETURN). Had this example been done with the embodiment in FIG. 4 hitting ENTER (or in the Mac version RETURN) would have simply given the user the additional line pair-parts and not triggered the evaluation of the formula pair-part 663 thereby not replacing the 'Result' 638 with the value in 668. There are a number of mix and match combinations of what triggers evaluation, adding pair-parts lines and as we will discuss later a variant of adding pair-parts lines which is splitting a line.

FIG. 7A and FIG. 7B example a method for combining pair-part lines in our technology. The instruction 734 for this embodiment explains two different ways to combine lines— 'Hit BACKSPACE at beginning of a line or click  to combine lines'. FIG. 7A and FIG. 7B example the second method using the combine button. In FIG. 7A the user clicks the button 727 to combine the top two lines as is then shown in FIG. 7B. This collapses the two-formula pair-parts 725 into one pair-part 765 with the cursor 762 between the content of the two previous formula pair-parts. In this embodiment the second formula pair-part content is presented in blue text to more readily identify for the user what has happened and as reminder to add an algebraic operator or other action before trying to calculate the line. In this embodiment the blue then goes away once the user does something. The button action also automatically collapses the two Result pair-part lines 728 into one 768 which at this point has not been evaluated so 'Result' rather than a value is shown.

FIG. 8A and FIG. 8B example another method in this embodiment for combining pair-part lines (components). The first of the two methods (underlined) of combining lines explained in the instruction—'Hit ENTER to split a line at the cursor, Hit BACKSPACE at beginning of a line or click  to combine lines' 834. The user has placed the cursor 822 at the beginning of the second formula pair-part 825. When they hit the 'backspace' key it combines the two top lines. This collapses the two-formula pair-parts 825 into one pair-part 865 with the cursor 862 between the content of the two previous formula pair-parts. This also automatically collapses the two Result pair-part lines 828 into one 868 which at this point has not been evaluated so 'Result' rather than a value is shown. In this embodiment this and the method exampled in FIG. 7A and FIG. 7B are two different ways of getting the same line combination outcome.

Figure 9A:
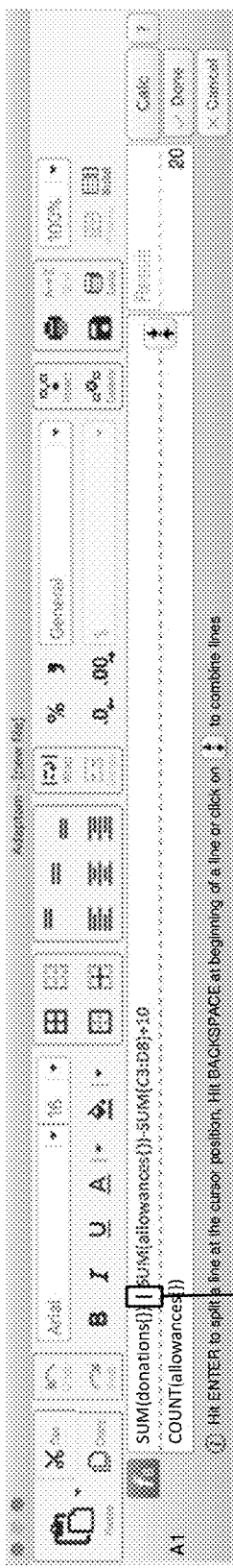
FIG. 9A, FIG. 9B and FIG. 9C example using combined pair-part lines (components).
Figure 9B:
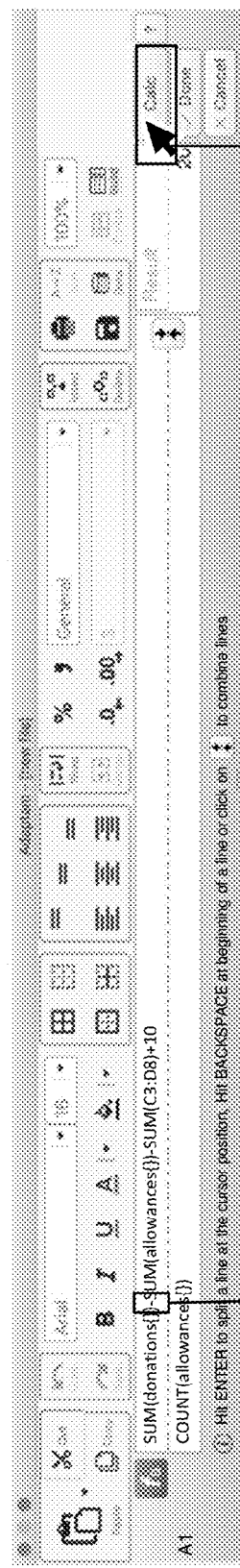
Figure 9C:
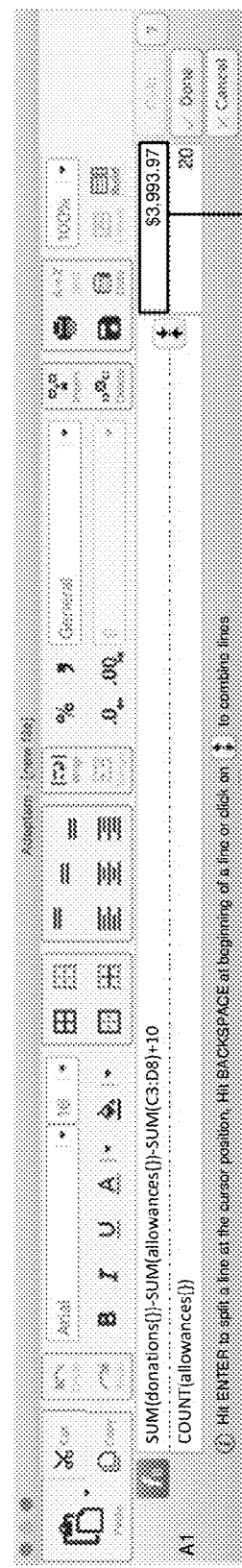

FIG. 9A through FIG. 9C examples using the combined lines and shows in this embodiment that triggering the pair-part evaluation of the combined lines works like previously shown for non-combined lines. FIG. 9A picks up with the outcome of either FIG. 7B or FIG. 8B with the cursor 922 ready in this example to add a minus sign operator '-' 962 (in FIG. 9B) to complete the formula. At that point the user clicks the Calc button 969 to trigger the evaluation of the formula shown in FIG. 9C 988, which works just as it did for a newly created formula in FIG. 5A through FIG. 5C.

Figure 10A:
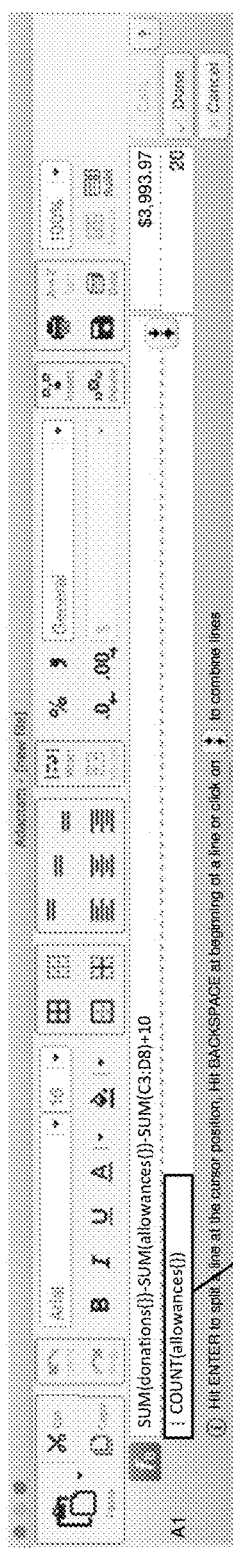
FIG. 10A, FIG. 10B and FIG. 10C examples finishing the formula (Done).
Figure 10B:
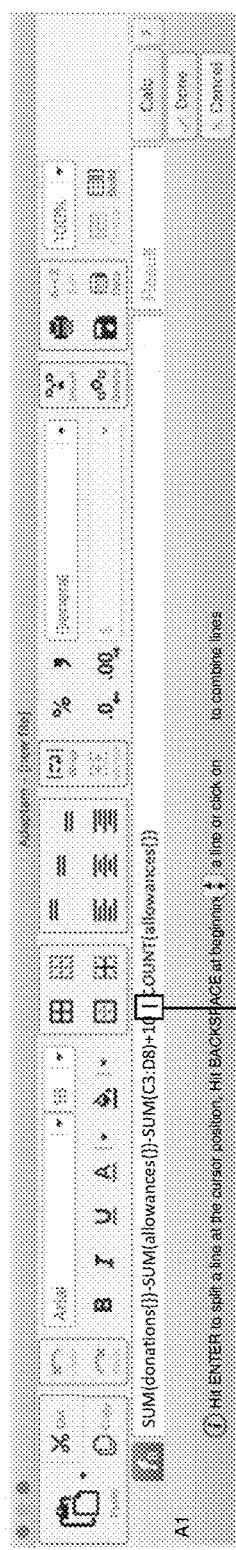
Figure 10C:
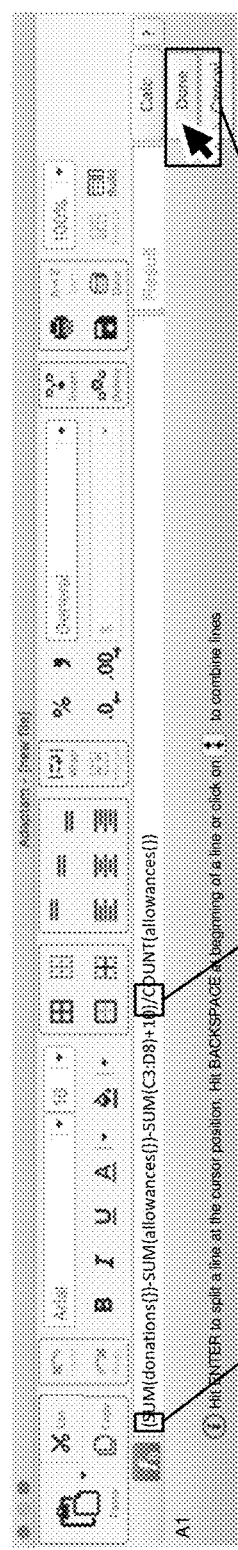
Figure 11:
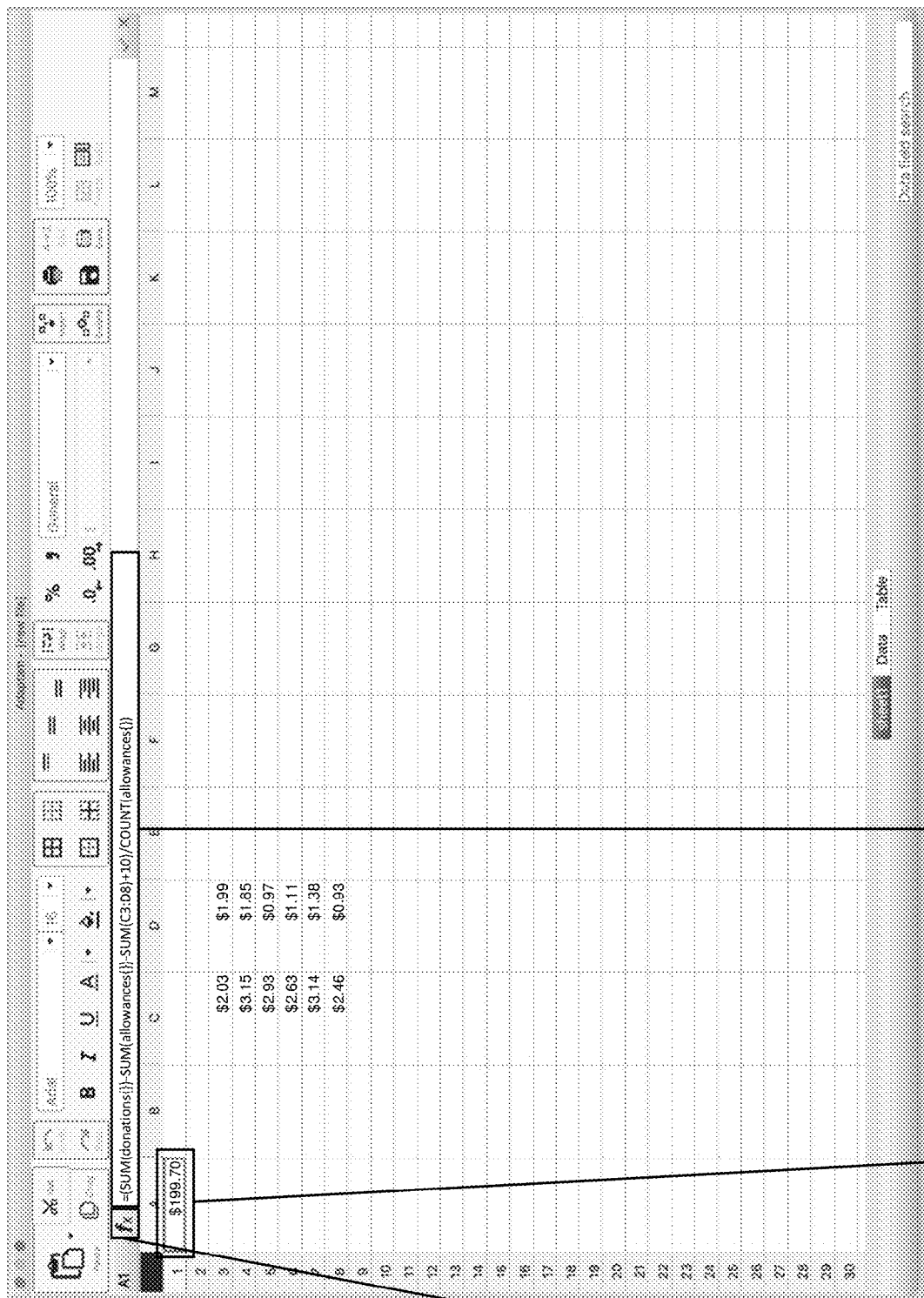
FIG. 11 shows the outcome of finishing (Done) the formula in FIG. 10C or FIG. 12B.

At this point the user has options on completing the build operation in this embodiment. In FIG. 10A through FIG. 10C they opt to combine the remaining two lines into one and complete the formula on one line before clicking done. They do this by hitting backspace with the cursor at the beginning of the second line 1033 collapsing the two lines into one with the cursor 1054 between the formula part content from the two lines as shown in FIG. 10B. The user then adds a parenthesis and divide operator ')/' 1085 and then the matching parenthesis '(' 1082 at which point they decide to click the Done button 1089 to finish the build operation. They could have clicked the Calc button to evaluate the formula first, but in this situation they were confident it would work and produce the outcome they were looking for, so they clicked 'Done'. FIG. 11 then shows the outcome. The user can now see they are out of the build mode and are back to the typical formula mode 1121 with the calculated value in cell 'A1' 1131 and the formula in the formula bar 1124. The user is enabled by the technology disclosed to evaluate the formula components and combinations of formula components they desired mixing algebraic, spreadsheet function, spreadsheet range and formulaic data elements in those components. It gave the user the chance to reality-check the individual formula components, see the results of formulaic data, see the results of range calculations and reality check combinations of components, giving the user the confidence they have the formula that they wanted with the logic they wanted.

Figure 12A:
FIG. 12A and FIG. 12B examples finishing the formula (Done) in one step to give the result in FIG. 11 from three-lines (components).
Figure 12B:

In an embodiment of our technology there is no requirement to combine down to one line before clicking Done. FIG. 12A and FIG. 12B example instead fixing the final formula when the user was back at the three-line (three component) stage shown in FIG. 12A. In FIG. 12B the user adds a parenthesis ('1272 and a minus operator 1273 to the first line, and a parenthesis and a division operator ')/' 1284 to the second line at which point they click the 'Done button' 1289 to get the same outcome shown in FIG. 11. In either situation the user has been able to see the evaluation of the different components of their formula, gain comfort they were getting the formula correct and then complete it. On the flip side had the user realized at any point along the way that they were not interested in proceeding with the formula they could click the 'Cancel button 1239 (in FIG. 12A) to revert back to their starting point, in this example an empty cell. However, in the event they were editing an existing formula in this embodiment they would revert back to that formula.

Figure 13A:
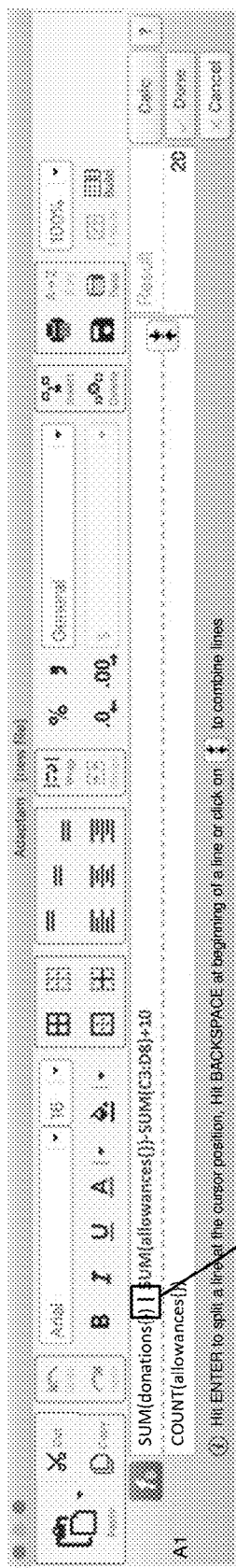
FIG. 13A and FIG. 13B examples how our technology identifies problems with any evaluated formula part (error messages).
Figure 13B:
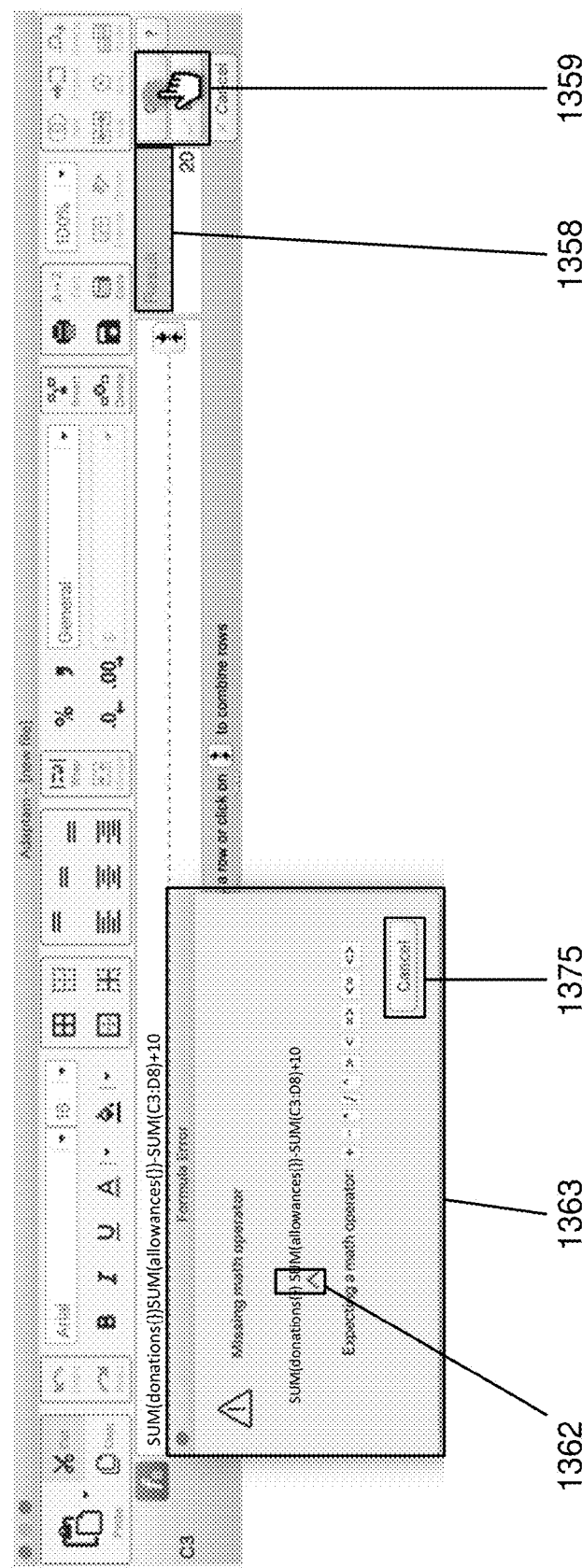

FIG. 13A and FIG. 13B examples how our technology identifies problems with any evaluated formula component. FIG. 13A shows an outcome from the combine done in either FIG. 7B or FIG. 8B. The user then immediately clicks the 'Calc' button 1359 before having replaced the cursor 1324 with the needed algebraic operator between the components of the formula from the two combined lines. The result is shown in the Formula Error pop-up 1363 explaining to the user the 'Missing Math operator' and in this example pointing out the location of the error 1362. In this embodiment it also shows a red 'Result' warning 1358 and requires the user to correct the error before proceeding with other operations (i.e., clicking the 'Cancel' the Calc button 1375 in the pop-up and fixing the component formula). This allows the user to ensure that each component of a formula works and makes diagnosing problems easy as you know which line (component) has the problem and the nature of the problem. It is worth noting that because this is evaluating a formula component there is an implicit equal sign '=' assumed at the start of each formula component relative to normal formula error evaluation, but otherwise the error evaluation is just like it would be for a complete formula.

Figures 14A, 14B:
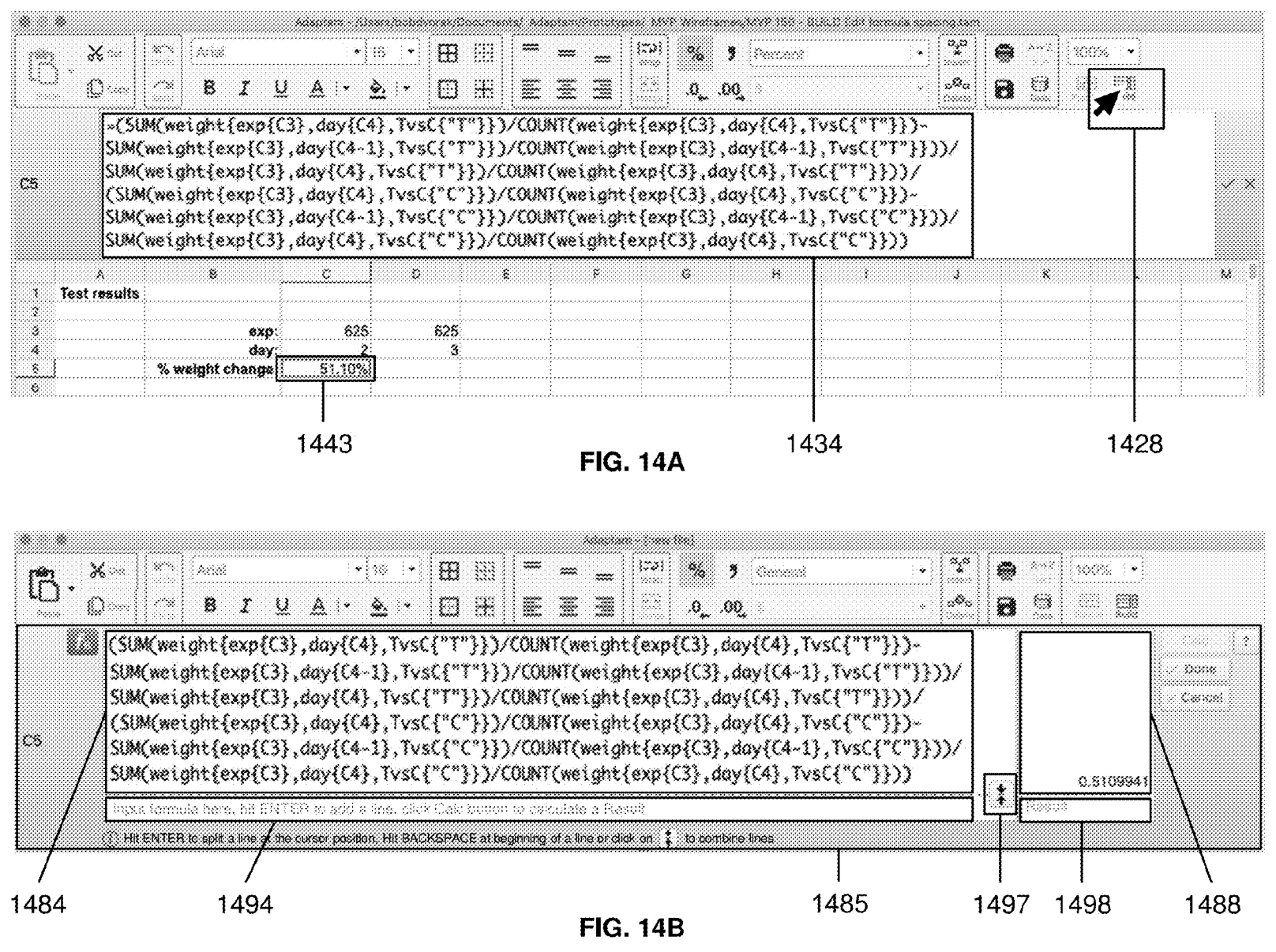

FIG. 14A through FIG. 16B examples how our technology can be applied to existing formulas and how users can split lines (components) for further evaluation or changes. FIG. 14A shows a complicated formula 1434 in cell 'C5' 1443 for which the user has decided to use the build capability to help them modify it. Note, this is a relatively sophisticated user who has manually put in ALT RETURNS (ENTERS in PC) to break the formula into more readable lines. They click the 'Build' button 1428 and get the Build bar 1485 prepopulated as shown in FIG. 14B. The formula is populated in the first formula pair-part 1484 while the calculated value is shown in the first Result pair-part 1488. In this embodiment there is a second line with a formula pair-part 1494 and a Result pair part 1498 ready for use as well and a combine button 1497. In other embodiments that combine button 1497 may not appear or may stay grayed out (disabled) until there is content in both of the lines (components) that it can combine.

Figures 15A, 15B:
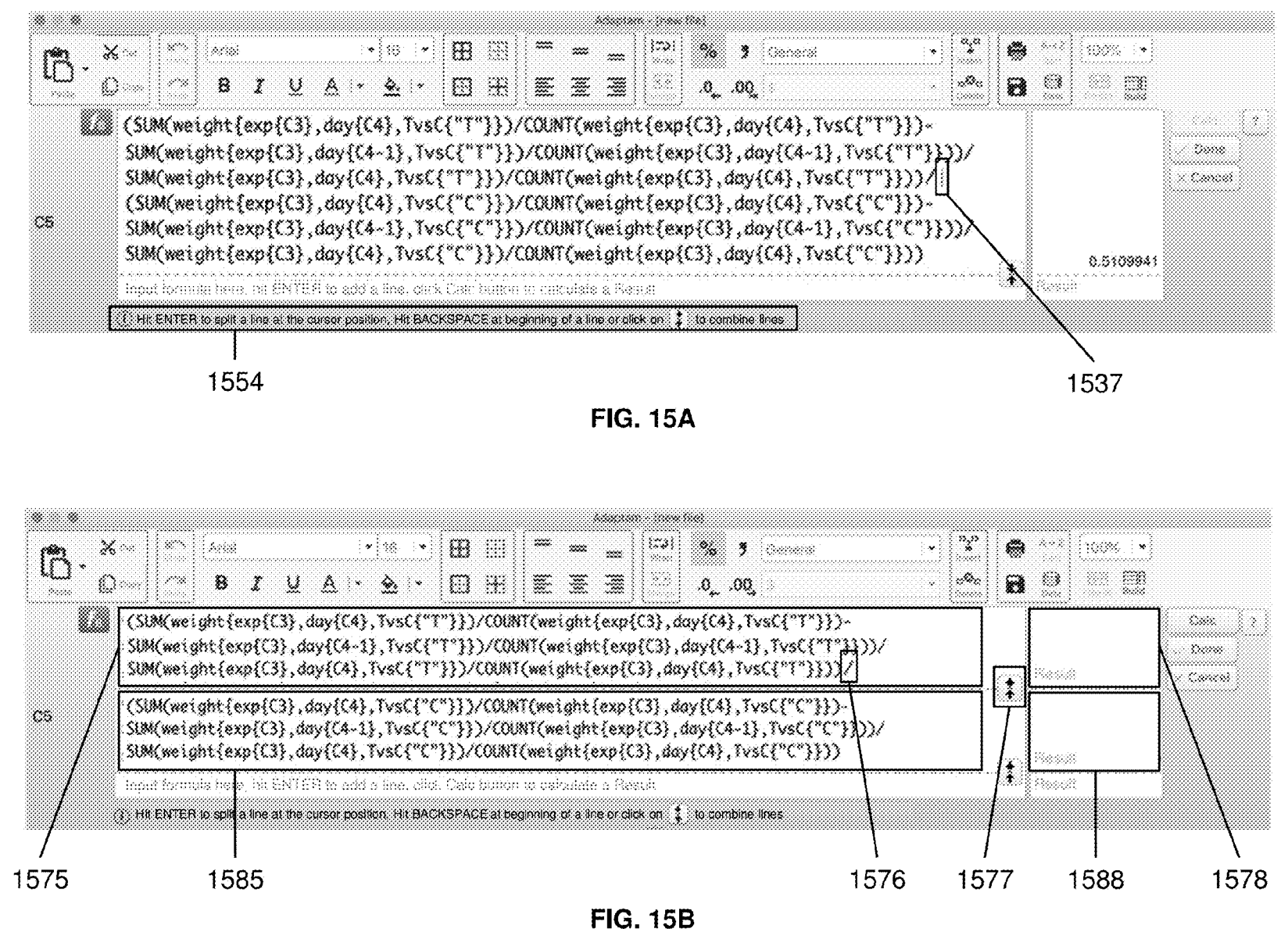
Figure 16A:
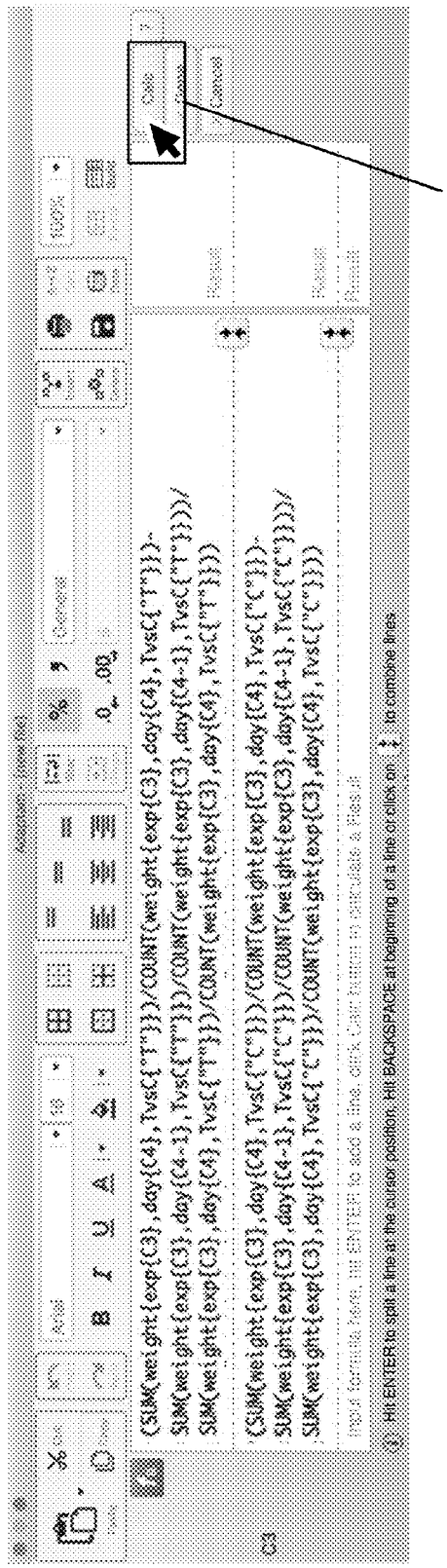
Figure 16B:
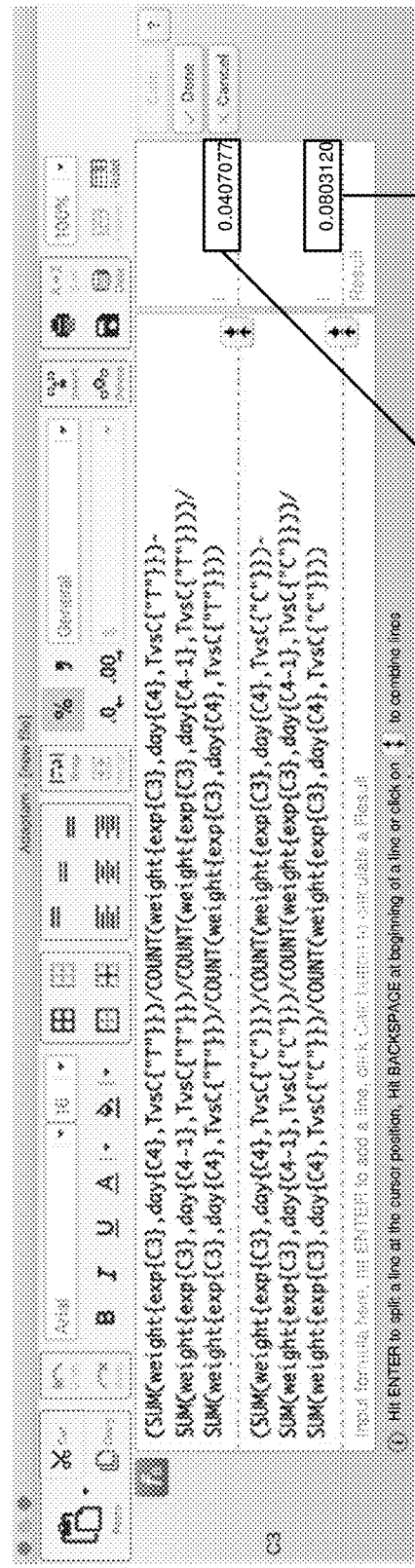

In FIG. 15A the user has positioned the cursor 1537 roughly halfway through the existing formula in the formula-pair. As it states in the line of instructions 1554 once the user hits ENTER (or on a Mac RETURN) they will split the formula into two lines at the point of the cursor 1537 as shown in FIG. 15B. That gives two formula pair-parts 1575 and 1585, two Result pair-parts 1578 and 1588 and adds a combine button 1577. Each of the pairs is then ready for evaluation or modification and the user removes the divide operator '/' 1576 to get the outcome shown in FIG. 16A. The user then opts to click the 'Calc' button 1629 which then evaluates both lines giving the pair-part results 1668 and 1678, as shown in FIG. 16B. The user could then proceed to use any of the other build technology functionality to further split, modify combine and/or add to the formula before clicking 'Done' to return the completed formula to cell 'C5'.

Figure 17:
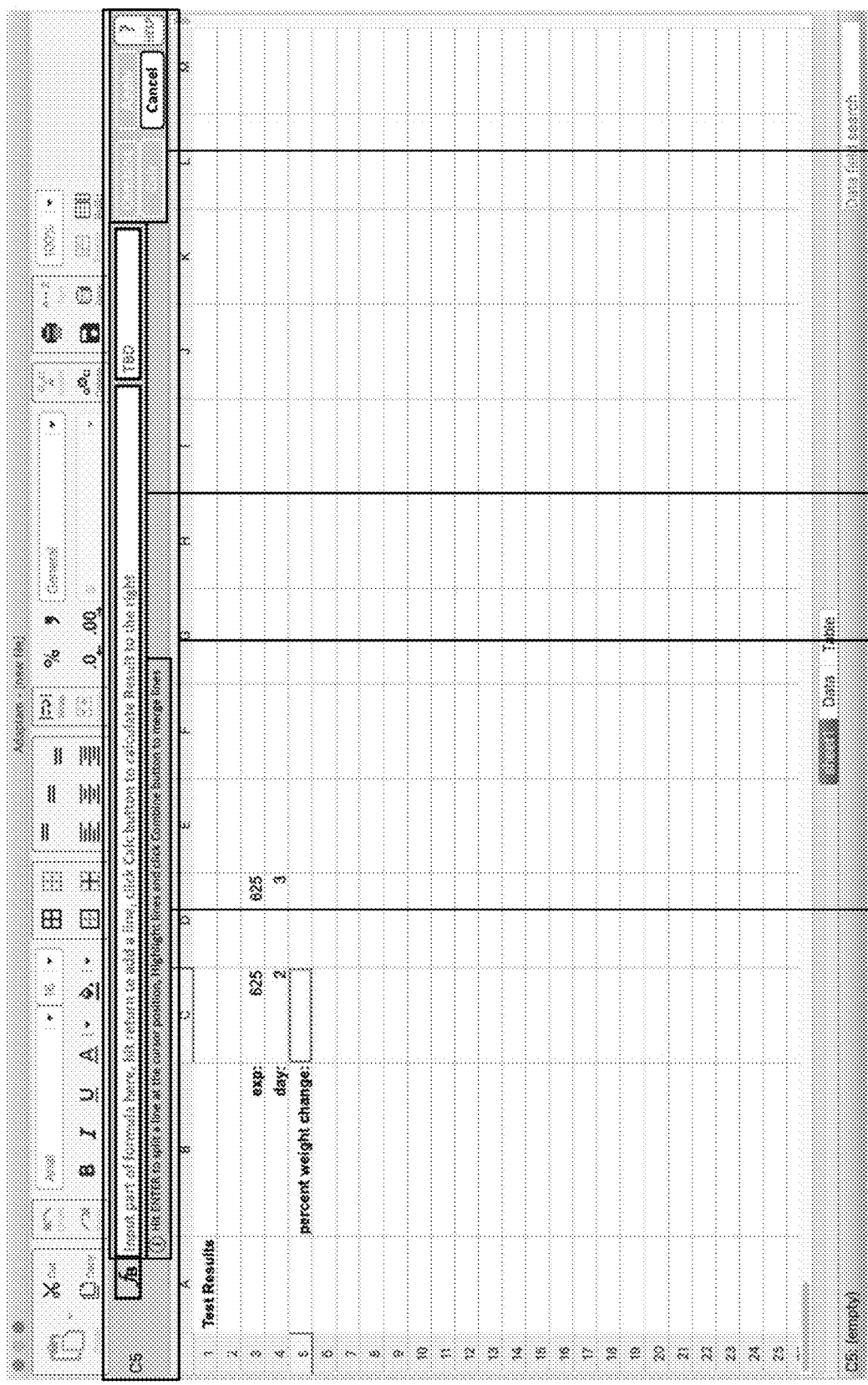
FIG. 17 examples another embodiment of our technology with a different number of starting pair-parts (i.e., one line) and a different button configuration.
Figures 18A, 18B:
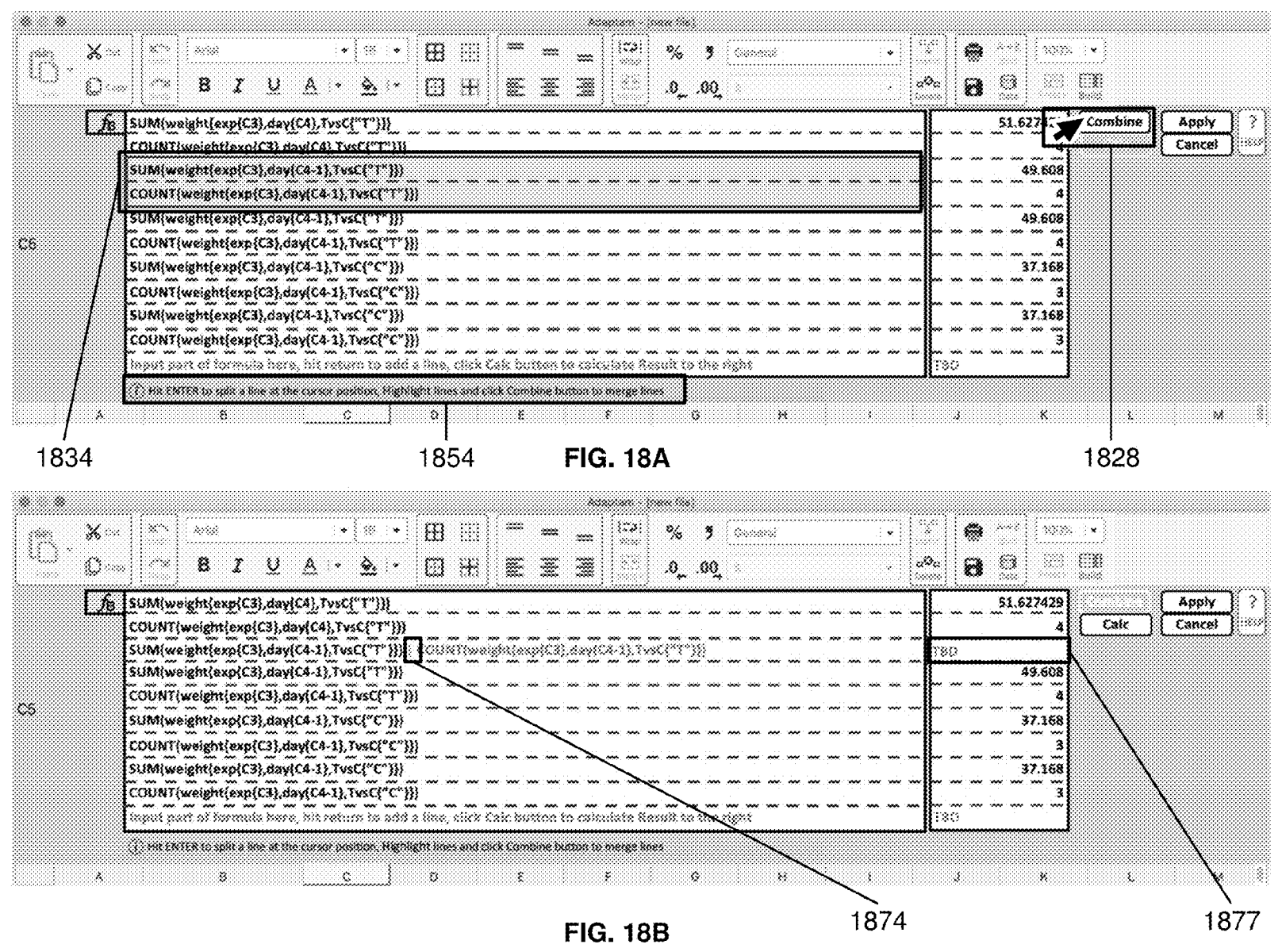

There are many different button, dropdown, pop-up and other UI configurations of our technology to build complex cell formulas. FIG. 17 examples an embodiment where the starting build bar 1735 begins with a single formula and result/evaluation pair-part 1725, a five-button cluster 1728 and an information line. 1733. FIG. 18 examples for that embodiment how the combine capability works as described in the informational line 1854 'Highlight lines and click Combine button to merge lines'. The third and the fourth lines (components) of formula pair-parts 1834 are highlighted and when the user clicks on the 'Combine' button 1828 they get the results shown in FIG. 18B. That is the outcome previously exampled where the two lines combine (merge) placing the cursor 1874 between the merged formula pair-parts and the combined result/evaluation pair-part states 'TBD' 1877.

Figure 19A:
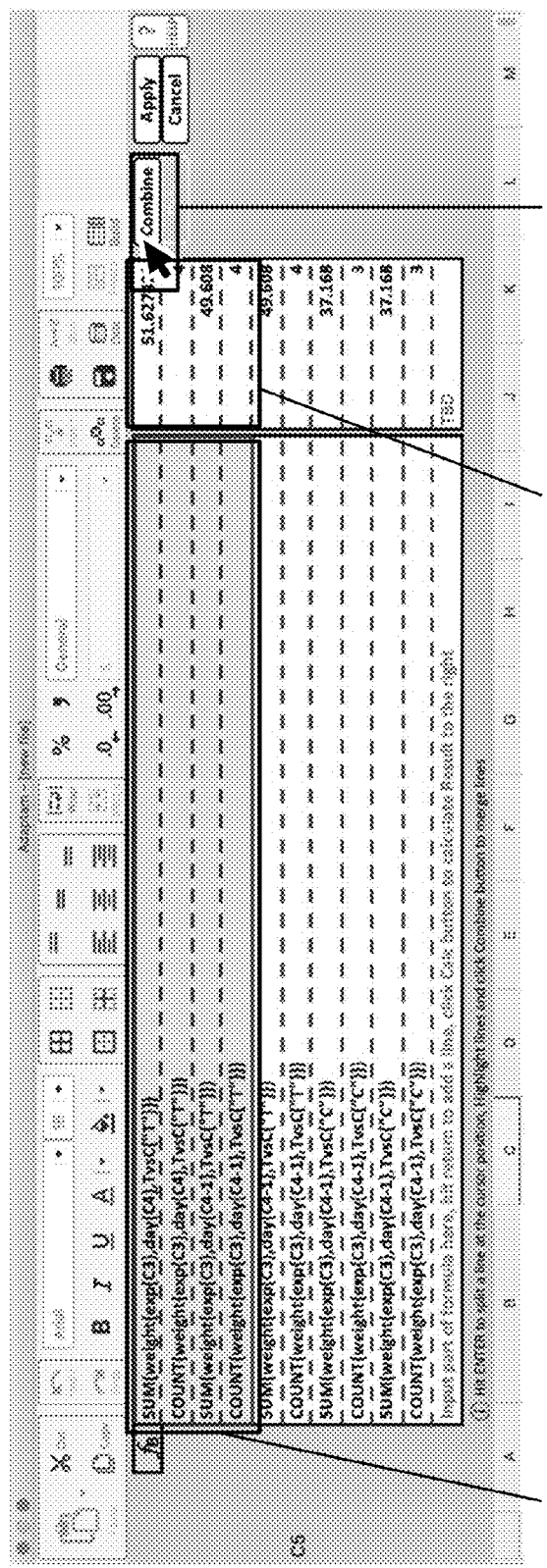
FIG. 19A and FIG. 19B examples combining four lines (components) into one.
Figure 19B:
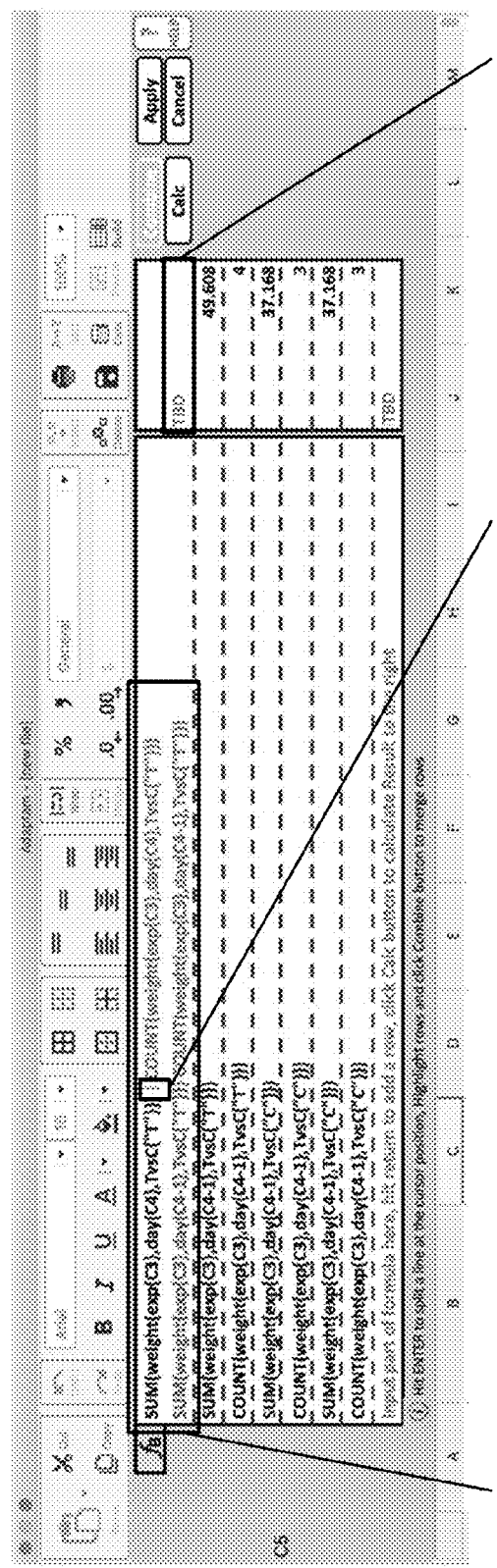

FIG. 19A and FIG. 19B examples the user combining four lines into one by highlighting four formula pair-part lines 1934 and clicking the 'Combine' button 1928. In this embodiment the cursor 1974 ends up between the content of the first two lines and the content from each line is colored differently 1975 until a change is made. The cursor could have ended up at the end of the new formula or some other position and the content does not need to be color differentiated but is done so to make it easy for the user to see what happened (other methods for differentiating those could be employed like different backgrounds or different colored underlines etc.). The calculated values 1937 for the four lines disappear and are replaced by a single gray 'TBD' 1977. These different embodiments are focused on making it very easy for users to evaluate any set of formula components and mix and match combinations of those components as users may want to see the individual calculations but will be better able to reality check combinations of the components. For example, test dish weights vary based on samples used are of interest to the cancer researcher, but they can better reality test the comparison of the test and control numbers which are more independent of the sample sizes—so they have an interest in seeing both as they develop the formula.

Figure 20A:
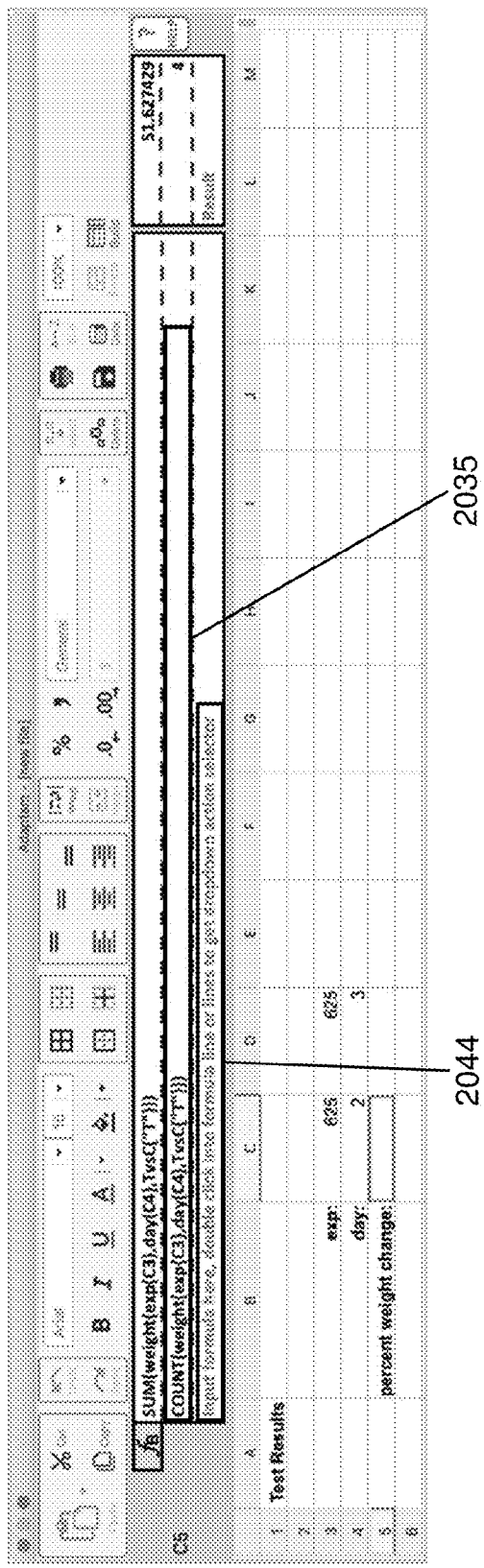
FIG. 20A and FIG. 20B examples another embodiment where the build bar actions are done through a drop-down selector rather than buttons or other actions.

FIG. 20A and FIG. 29B examples another embodiment where the build bar actions are done through a drop-down selector rather than buttons or other actions. In this embodiment there is information in the blank cell input 'Input formula here, double click into formula line or lines to get dropdown action selector' 2044 that lets the user know to double click into a line or lines to get the drop-down action selector. FIG. 20A examples a user double clicking into the second line of the formula pair-part 2035 which then displays the dropdown 2083 in FIG. 20B with all the actions. That drop-down 2083 has options for each action. 'Finish formula' does the equivalent of the 'Done' button 1089 (in FIG. 10C) and 1289 (in FIG. 12B). 'Cancel Build' does the equivalent of the 'Cancel' button 1239 (in FIG. 12A). 'Calculate Result(s)' evaluates the formula pair-part or pair parts as previously exampled for the 'Calc' button. 'Combine line(s)' can function like the 'Combine' button 1828 (in FIG. 18A) to combine highlighted lines. 'Add line' can add a line of pair-parts above or below the highlighted line. 'Split line' can split the pair-parts line at the point of the cursor. In this embodiment the technology grays out (disables) any action which is not applicable for this line or at this point in activities. While the syntax for the actions is different than the previously used buttons, the activities they execute ultimately deliver the same outcomes.

While there are many different possible embodiments of the disclosed technology, such as using a sidebar for the activity selection, each of them simplifies in spreadsheets the construction of a complex formula showing the user desired formula component evaluations/results along the way. They allow users to separately evaluate components of a complex multi-component formula while seamlessly creating the overall formula. They allow users to see and test against their expectations, values calculated for components of a formula and see combinations of those components. They identify calculation errors at the formula component level and allow easy combinations to create the final formula. The technology can be applied to already created formulas allowing users to probe its formula component values and/or modify those formula and see new component level results of those modifications before recombining to a single formula.

Computer System

Figure 21:
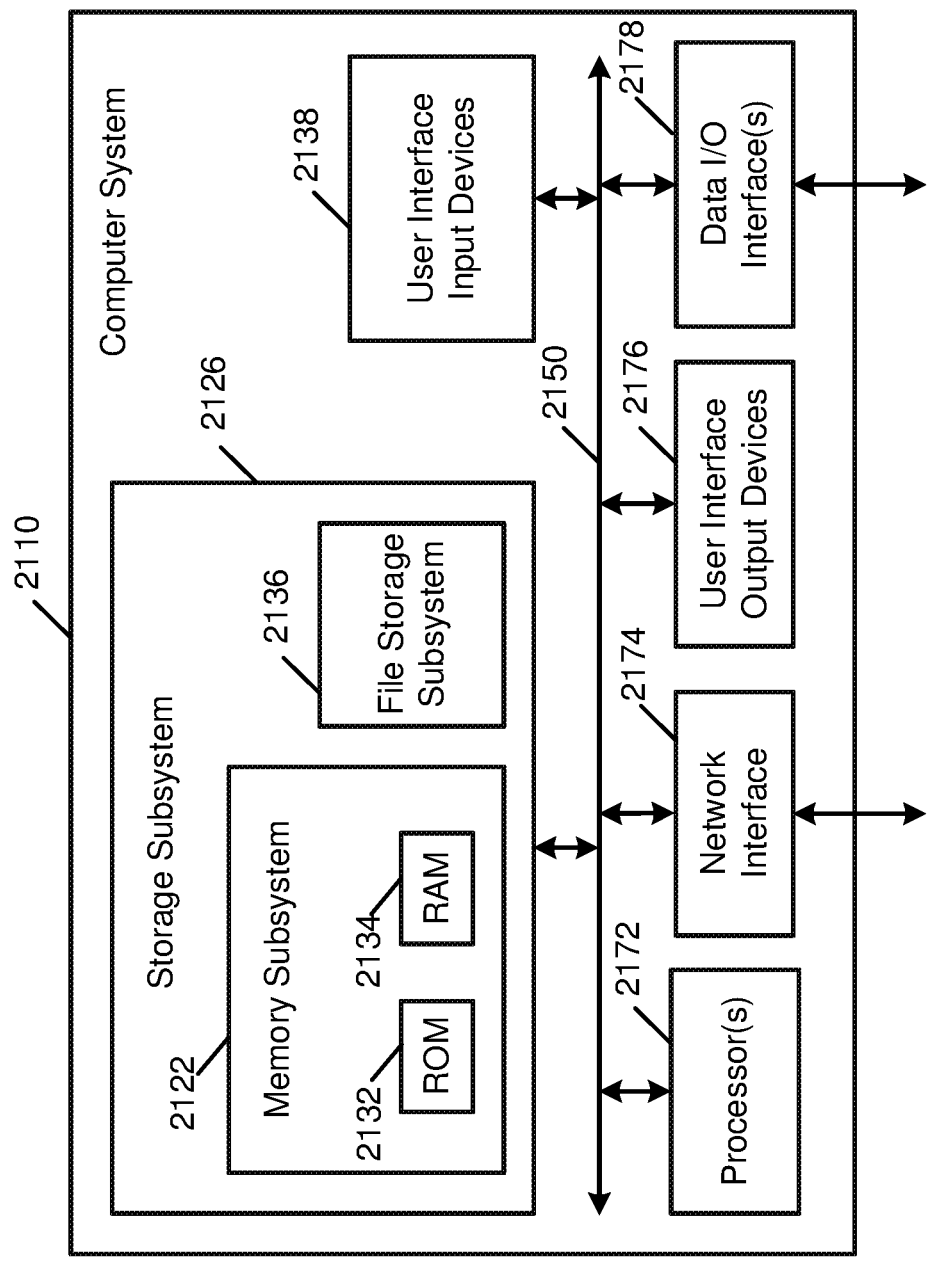
FIG. 21 depicts an example computer system that can be used to implement aspects of the technology disclosed.

FIG. 21 is a block diagram of an example computer system, according to one implementation. Computer system 2110 typically includes at least one processor 2172 which communicates with a number of peripheral devices via bus subsystem 2150. These peripheral devices may include a storage subsystem 2126 including, for example, memory devices and a file storage subsystem, user interface input devices 2138, user interface output devices 2176, and a network interface subsystem 2174. The input and output devices allow user interaction with computer system 2110. Network interface subsystem 2174 provides an interface to outside networks, including an interface to a communication network, and is coupled via communication network to corresponding interface devices in other computer systems or in the cloud and usable for cloud applications.

User interface input devices 2138 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2110 or onto communication network.

User interface output devices 2176 may include a display subsystem, a printer, a fax machine, or non-visual displays such as audio output devices. The display subsystem may include a touch screen, a flat-panel device such as a liquid crystal display (LCD), a projection device, a cathode ray tube (CRT), or some other mechanism for creating a visible image. The display subsystem may also provide a non-visual display such as via audio output devices. In general, use of the term "output device" is intended to include all possible types of devices and ways to output information from computer system 2110 to the user or to another machine or computer system.

Storage subsystem 2126 stores programming and data constructs that provide the functionality of some or all of the modules and methods described herein. These software modules are generally executed by processor 2172 alone or in combination with other processors.

Memory 2122 used in the storage subsystem can include a number of memories including a main random-access memory (RAM) 2134 for storage of instructions and data during program execution and a read only memory (ROM) 2132 in which fixed instructions are stored. A file storage subsystem 2136 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 2136 in the storage subsystem 2126, or in other machines accessible by the processor.

Bus subsystem 2150 provides a mechanism for letting the various components and subsystems of computer system 2110 communicate with each other as intended. Although bus subsystem 2150 is shown schematically as a single bus, alternative implementations of the bus subsystem may use multiple busses.

Computer system 2110 can be of varying types including a workstation, server, computing cluster, blade server, server farm, or any other data processing system or computing device. Due to the ever-changing nature of computers and networks, the description of computer system 2110 depicted in FIG. 21 is intended only as one example. Many other configurations of computer system 2110 are possible having more or fewer components than the computer system depicted in FIG. 21.

Some Particular Implementations

Some particular implementations and features are described in the following discussion. The technology disclosed can be practiced in a variety of methods, devices, combination of devices or systems or a computer readable media impressed with program instructions that, when executed on hardware cause the hardware either to carry out a disclosed method or combine with the hardware to form a disclosed device or system.

One implementation of the technology provides a spreadsheet user interface (UI) for constructing a complex multi-part formula in parts that can be evaluated piecewise as part of building the formula. FIG. 4 and FIG. 17 example our formula building UI opening with a plurality of pair-parts, a pair-part for the formula and a pair-part for evaluation (result) of the formula. To support creating and evaluating additional components of the formula, additional lines of pair-parts can be added as shown in FIG. 6A, and FIG. 6B. This basic interface can be combined with one or more of the features in the following paragraphs.

Triggering formula pair-part evaluation is exampled in FIG. 5A through FIG. 5C (as well as in FIG. 6A and FIG. 6B, in FIG. 9B and FIG. 9C, and FIG. 16A and FIG. 16B). This allows users to evaluate components of the desired formula piecewise.

Combining successive pair-parts for further evaluation or completion of the formula is exampled in FIG. 7A and FIG. 7B, FIG. 8A and FIG. 8B, FIG. 10A through FIG. 10C, and FIG. 12B delivering FIG. 11. Allowing users to do interim combinations before completing all the lines of pair-parts or complete all the combinations at once to return a single formula and value to the cell, as shown in FIG. 11. With the interim combinations leading to a single component completion of the formula exampled in FIG. 10C delivering FIG. 11 and the multiple combinations at once completion of the formula exampled in FIG. 12B delivering FIG. 11.

Our technology works with data inputs and cell reference inputs, as exampled in FIG. 6A through FIG. 13B, and our Non-spreadsheet cell formulaic data, as exampled in FIG. 5A through FIG. 16B and FIG. 18A through FIG. 20B. It supports use of the full set of algebraic operators and full set of functions.

In one implementation of our technology adding a new line (component) of pair-parts is accomplished by hitting the ENTER on a PC or RETURN on a Mac key, as exampled in FIG. 6A and FIG. 6B. Or the same activity/outcome could be accomplished by hitting a button or making a selection in a drop-down as exampled in the 'Add line' 2082 option in FIG. 20B.

Figure 20B:
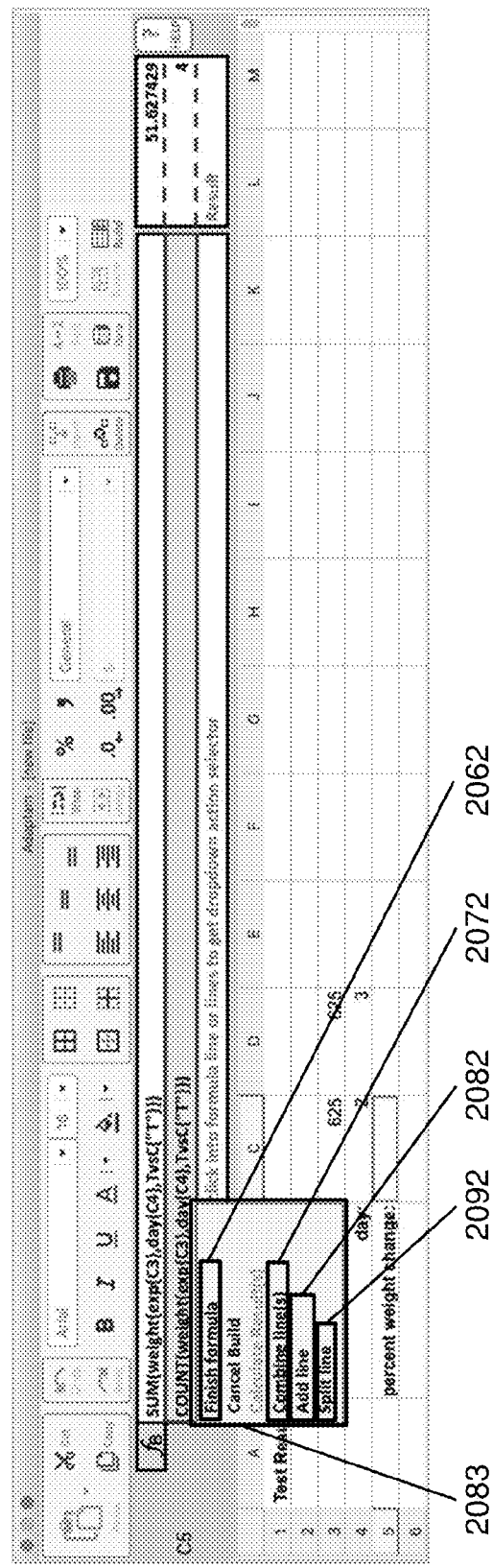

Splitting a line (component) of pair-parts into two lines (components) of pair-parts is accomplished by hitting the ENTER key on a PC or RETURN key on a Mac, as exampled in FIG. 15A and FIG. 15B, hitting a button or making a selection in a drop-down pop-up or other visual, as exampled in the 'Split line' 2092 option in FIG. 20B.

In one embodiment the evaluation of one or more formula pair-parts is triggered by clicking a button, as exampled in FIG. 5A through FIG. 5C (as well as FIG. 9B and FIG. 9C, and FIG. 16A and FIG. 16B), or by hitting the ENTER key on a PC or RETURN key on a Mac, as exampled in FIG. 6A and FIG. 6B, and/or making a selection in a drop-down pop-up or other visual, as exampled in the 'Calculate Result(s)' option in FIG. 20B (when it is not disabled as it is in the UI 2083). These and other different triggering actions can be combined in an implementation to give users multiple different ways to trigger evaluation. As other of the BUILD actions previously described can be combined to give users different ways to trigger the actions. Some implementations of the features described are further detailed as follows.

One implementation of our technology supports the evaluation of one or more formula parts being subject to spreadsheet error messages with an implicit equal sign (=) if needed, as exampled in FIG. 13A and FIG. 13B.

In implementation of our technology the combining of successive pair-parts is done by clicking a button, as exampled in FIG. 7A and FIG. 7B (as well as in FIG. 18A and FIG. 18B, and FIG. 19A and FIG. 19B), and/or making a selection within a drop-down, pop-up or other visual, as exampled in the 'Combine line(s)' 2072 option in FIG. 20B. An embodiment of our technology supports combining the successive pair-parts done by hitting a backspace at the beginning of the second-line formula pair-part of the two to be combined, as exampled in FIG. 8A and FIG. 8B.

In one embodiment of our technology the completion of the entire formula is done by clicking a button, as exampled in FIG. 10C delivering FIG. 11 (as well as in FIG. 12B delivering FIG. 11), and/or making a selection in a drop-down, pop-up or other visual, as exampled in the 'Finish formula' 2062 option in FIG. 20B.

One implementation of our technology supports editing an existing formula by populating it into a pair-parts, as shown in FIG. 14A and FIG. 14B which then has the full capabilities of the user interface as is partially exampled in FIG. 15A through FIG. 16B.

The technology disclosed can be practiced as a method, system or computer readable media. A computer-implemented system implementation can include at least one processor and memory coupled to the processor, the memory holding program instructions that, when executed, implement a method of providing a spreadsheet user interface for constructing a complex multi-part formula in parts that can be evaluated piecewise. This system implemented method can include any of the features described above. A non-transitory computer-readable medium holding program implementation can include instructions that, when executed on a processor, implement a method of providing a spreadsheet user interface for constructing a complex multi-part formula in parts that can be evaluated piecewise. As with the system, the method implemented by instructions held by the computer-readable medium can include any of the features describe above.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

I claim as follows:

1. A method of providing a spreadsheet user interface for controlling evaluation of parts of a multi-component formula while building the multi-component formula in parts including:
   presenting an interface for building the multi-component formula held in a single spreadsheet cell, wherein:
      before combination into a single component-line of text, each component of the multi-component formula is displayed in a component-line, comprising one or more lines of text that are visually grouped, and
      each displayed component-line comprises pair-parts including: a single formula component part that can be evaluated to return a value; and a single evaluation part in which the value returned by evaluating the single formula component part is displayed;

wherein the interface supports user manipulation of the displayed component-lines of the single spreadsheet cell:

to separate a formula part of a first component line of the displayed component lines into two formula parts of successive component-lines each of which includes a respective evaluation part; and to merge and collapse the two successive component-lines into the first component-line;

in response to receiving a separating input, replacing the first component line with the two successive displayed component-lines and replacing the evaluation part of the first component line with the respective evaluation parts; and in response to receiving a collapse input, replacing the two formula parts of the successive component-lines with the formula part of the first component-line that combines the two formula parts and a single evaluation part that combines the respective evaluation parts.

2. The method of claim 1, further including accepting input that specifies collapsing of four or more component-lines of the multi-component formula into the single component-line and responding by replacing separate evaluation parts with the single evaluation part.

3. The method of claim 1, wherein the multi-component formula includes at least two functions connected by an algebraic operator and the separating input separates the multi-component formula at the algebraic operator and not within parenthesis of the functions.

4. The method of claim 1, further including:

accepting input that creates a new component line including a new formula component part and a new evaluation part; and automatically generating an evaluation in the new evaluation part of the new component line, responsive to completion of the input of the new formula component part.

5. The method of claim 1, wherein data used in the multi-component formula is from data inputs, cell data and/or Non-spreadsheet cell data.

6. The method of claim 1, wherein multiple algebraic operators and/or functions are used in the multi-component formula.

7. The method of claim 1, further including adding a new component-line of pair-parts responsive to a user hitting ENTER (on PC operating systems) or RETURN (on other operating systems).

8. The method of claim 1, further including adding one or more new component-lines of pair-parts responsive to a user hitting a button and/or making a selection in a drop-down, pop-up or other visual.

9. The method of claim 1, further including separating the first component-line of pair-parts responsive to a user hitting ENTER (on PC operating systems) or RETURN (on other operating systems), hitting a button and/or making a selection in a drop-down, pop-up or other visual.

10. The method of claim 1, further including evaluating the single formula component part responsive to a user clicking a button, hitting ENTER (on PC operating systems) or RETURN (on other operating systems) and/or making a selection in a drop-down, pop-up or other visual selection.

11. The method in claim 1, wherein an evaluation of the single formula component part is subject to spreadsheet cell error messages with an implicit equal sign (=).

12. The method of claim 1, wherein collapsing the successive component-lines is responsive to a user clicking a button and/or making a selection within a drop-down, pop-up or other visual selection.

13. The method of claim 1, wherein collapsing the successive component-lines is responsive to a user hitting backspace at a beginning of a line displaying a second pair-part of the successive component-lines to be combined.

14. The method of claim 1, wherein completion of the multi-component formula is responsive to a user clicking a button or making a selection in a dropdown, pop-up or other visual.

15. A non-transitory computer-readable medium holding program instructions that, when executed on a processor, implement a method of providing a spreadsheet user interface for controlling evaluation of parts of a multi-component formula while building the multi-component formula in parts including:

presenting an interface for building the multi-component formula held in a single spreadsheet cell, wherein:

before combination into a single component-line of text, each component of the multi-component formula is displayed in a component-line, comprising one or more lines of text that are visually grouped, and each displayed component-line comprises pair-parts including: a single formula component part that can be evaluated to return a value; and a single evaluation part in which the value returned by evaluating the single formula component part is displayed;

wherein the interface supports user manipulation of the displayed component-lines of the single spreadsheet cell:

to separate a formula part of a first component line of the displayed component lines into two formula parts of successive component-lines each of which includes a respective evaluation part; and to merge and collapse the two successive component-lines into the first component-line;

in response to receiving a separating input, replacing the first component line with the two successive displayed component-lines and replacing the evaluation part of the first component line with the respective evaluation parts; and in response to receiving a collapse input, replacing the two formula parts of the successive component-lines with the formula part of the first component-line that combines the two formula parts and a single evaluation part that combines the respective evaluation parts.

16. The non-transitory computer readable medium of claim 15, further including accepting input that specifies collapsing of four or more component-lines of the multi-component formula into the single component-line and responding by replacing separate evaluation parts with a single evaluation part.

17. The non-transitory computer readable medium of claim 15, wherein the multi-component formula includes at least two functions connected by an algebraic operator and the separating input separates the multi-component formula at the algebraic operator and not within parenthesis of the functions.

18. The non-transitory computer readable medium of claim 15, further including:

accepting input that creates a new component line including a new formula component part and a new evaluation part; and automatically generating an evaluation in the new evaluation part of the new component line, responsive to completion of the input of the new formula component part.

19. The non-transitory computer readable medium of claim 15, wherein data used in the multi-component formula is from data inputs, cell data and/or Non-spreadsheet cell data.

20. The non-transitory computer readable medium of claim 15, wherein multiple algebraic operators and/or functions are used in the multi-component formula.

21. The non-transitory computer readable medium of claim 15, further including adding a new component-line of pair-parts responsive to a user hitting ENTER (on PC operating systems) or RETURN (on other operating systems).

22. The non-transitory computer readable medium of claim 15, further including adding one or more new component-lines of pair-parts responsive to a user hitting a button and/or making a selection in a drop-down, pop-up or other visual.

23. The non-transitory computer readable medium of claim 15, further including separating the first component-line of pair-parts responsive to a user hitting ENTER (on PC operating systems) or RETURN (on other operating systems), hitting a button and/or making a selection in a drop-down, pop-up or other visual.

24. The non-transitory computer readable medium of claim 15, further including evaluating the single formula component part responsive to a user clicking a button, hitting ENTER (on PC operating systems) or RETURN (on other operating systems) and/or making a selection in a drop-down, pop-up or other visual.

25. The method in claim 15, wherein an evaluation of the single formula component part is subject to spreadsheet cell error messages with an implicit equal sign (=).

26. The non-transitory computer readable medium of claim 15, wherein collapsing the successive component-lines is responsive to a user clicking a button and/or making a selection within a drop-down, pop-up or other visual selection.

27. The non-transitory computer readable medium of claim 15, wherein collapsing the successive component-lines is responsive to a user by hitting backspace at the beginning of a line displaying a second pair-part of the two pair-parts to be combined.

28. The non-transitory computer readable medium of claim 15, wherein completion of the multi-component formula is responsive to a user by clicking a button or making a selection in a dropdown, pop-up or other visual.

29. A computer-implemented system including at least one processor and memory coupled to the processor, the memory holding program instructions that, when executed, implement actions that implement a spreadsheet user interface for controlling evaluation of parts of a multi-component formula while building the multi-component formula in parts, the actions including:
presenting an interface for building the multi-component formula held in a single spreadsheet cell, wherein:
before combination into a single component-line of text, each component of the multi-component formula is displayed in a component-line, comprising one or more lines of text that are visually grouped, and
each displayed component-line comprises pair-parts including: a single formula component part that can be evaluated to return a value; and a single evaluation part in which the value returned by evaluating the single formula component part is displayed;
wherein the interface supports user manipulation of the displayed component-lines of the single spreadsheet cell:
to separate a formula part of a first component line of the displayed component lines into two formula parts of successive component-lines each of which includes a respective evaluation part; and
to merge and collapse the two successive component-lines into the first component-line;
in response to receiving a separating input, replacing the first component line with the two successive displayed component-lines and replacing the evaluation part of the first component line with the respective evaluation parts; and
in response to receiving a collapse input, replacing the two formula parts of the successive component-lines with the formula part of the first component-line that combines the two formula parts and a single evaluation part that combines the respective evaluation parts.

30. The system of claim 29, further including accepting input that specifies collapsing of four or more component-lines of the multi-component formula into the single component-line and responding by replacing separate evaluation parts with the single evaluation part.

31. The system of claim 29, wherein the multi-component formula includes at least two functions connected by an algebraic operator and the separating input separates the multi-component formula at the algebraic operator and not within parenthesis of the functions.

32. The system of claim 29, further including:
accepting input that creates a new component line including a new formula component part and a new evaluation part; and
automatically generating an evaluation in the new evaluation part of the new component line, responsive to completion of the input of the new formula component part.

33. The system of claim 29, wherein data used in the multi-component formula is from data inputs, cell data and/or Non-spreadsheet cell data.

34. The system of claim 29, wherein multiple algebraic operators and/or functions are used in the multi-component formula.

35. The system of claim 29, further including adding a new component-line of pair-parts responsive to a user hitting ENTER (on PC operating systems) or RETURN (on other operating systems).

36. The system of claim 29, further including adding one or more new component-lines of pair-parts responsive to a user hitting a button and/or making a selection in a drop-down, pop-up or other visual.

37. The system of claim 29, further including separating the first component-line of pair-parts responsive to a user hitting ENTER (on PC operating systems) or RETURN (on other operating systems), hitting a button and/or making a selection in a drop-down, pop-up or other visual.

38. The system of claim 29, further including evaluating the single formula component part responsive to a user clicking a button, hitting ENTER (on PC operating systems) or RETURN (on other operating systems) and/or making a selection in a drop-down, pop-up or other visual.

39. The system of claim 29, wherein an evaluation of the single formula component part is subject to spreadsheet cell error messages with an implicit equal sign (=).

40. The system of claim 29, wherein collapsing the successive component-lines is responsive to a user clicking a button and/or making a selection within a drop-down, pop-up or other visual selection.

41. The system of claim 29, wherein collapsing the successive component-lines is responsive to a user hitting backspace at a beginning of a line displaying a second pair-part of the successive component-lines to be combined.

42. The system of claim 29, wherein completion of the multi-component formula is responsive to a user clicking a button or making a selection in a dropdown, pop-up or other visual.

\* \* \* \* \*